United States Patent
Li et al.

(10) Patent No.: US 10,411,911 B2
(45) Date of Patent: Sep. 10, 2019

(54) NETWORK AS SERVICE SERVICE CROSS-DOMAIN ORCHESTRATION METHOD, ORCHESTRATION DEVICE, AND CONTROL DEVICE

(71) Applicant: Huawei Technologies Co., Ltd., Shenzhen (CN)

(72) Inventors: Fengkai Li, Beijing (CN); Enhui Liu, Beijing (CN); Chengyong Lin, Beijing (CN); Wenxia Dong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 106 days.

(21) Appl. No.: 15/639,769

(22) Filed: Jun. 30, 2017

(65) Prior Publication Data

US 2017/0302474 A1  Oct. 19, 2017

Related U.S. Application Data

(63) Continuation of application No. PCT/CN2014/095823, filed on Dec. 31, 2014.

(51) Int. Cl.
*H04L 12/46* (2006.01)
*H04L 12/24* (2006.01)
*H04L 12/715* (2013.01)

(52) U.S. Cl.
CPC .......... *H04L 12/46* (2013.01); *H04L 12/4625* (2013.01); *H04L 41/044* (2013.01); *H04L 41/12* (2013.01); *H04L 45/04* (2013.01)

(58) Field of Classification Search
CPC ..... H04L 12/46; H04L 41/12; H04L 12/4625; H04L 41/044; H04L 45/04
See application file for complete search history.

(56) References Cited

U.S. PATENT DOCUMENTS

2008/0095176 A1  4/2008  Ong et al.
2011/0019674 A1* 1/2011  Iovanna .................. H04L 45/02
                                                    370/392
(Continued)

FOREIGN PATENT DOCUMENTS

CN  102299852 A  12/2011
CN  103166876 A  6/2013
(Continued)

OTHER PUBLICATIONS

Machine Translation and Abstract of Chinese Publication No. CN102299852, Dec. 28, 2011, 13 pages.
Machine Translation and Abstract of Chinese Publication No. CN103166876, Jun. 19, 2013, 13 pages.
Machine Translation and Abstract of Chinese Publication No. CN103428031, Dec. 4, 2013, 8 pages.
(Continued)

*Primary Examiner* — Walli Z Butt
(74) *Attorney, Agent, or Firm* — Conley Rose, P.C.

(57) ABSTRACT

A network as a service (NaaS) service cross-domain orchestration method to implement an end-to-end NaaS service in a multi-domain network that includes multiple network domains where the method includes obtaining information about a first user-to-network interface (UNI) and information about a second UNI in a multi-domain network according to a received NaaS service request, where the NaaS service request is used to request to establish an NaaS service between a first terminal and a second terminal; querying domain resource information to obtain a cross-domain path between the first UNI and the second UNI; determining network domains that the cross-domain path passes through, and obtaining a first connection requirement and a second connection requirement of each network domain of the network domains that the cross-domain path passes through; and sending the first connection requirement and the second connection requirement to a control device in each network domain.

18 Claims, 18 Drawing Sheets

(56) References Cited

U.S. PATENT DOCUMENTS

| | | | | |
|---|---|---|---|---|
| 2014/0301192 A1* | 10/2014 | Lee | ............... | H04L 47/10 370/230 |
| 2015/0207736 A1* | 7/2015 | Roch | ............... | H04L 45/34 370/393 |
| 2016/0134527 A1* | 5/2016 | Kwak | ............... | H04L 45/586 370/352 |

FOREIGN PATENT DOCUMENTS

| | | |
|---|---|---|
| CN | 103428031 A | 12/2013 |
| EP | 2568672 A1 | 3/2013 |
| WO | 2013149675 A1 | 10/2013 |
| WO | 2014055400 A1 | 4/2014 |

OTHER PUBLICATIONS

"OpenFlow Switch Specification," Version 1.5.0 (Protocol Version 0x06), Dec. 19, 2014, 277 pages.

Foreign Communication From A Counterpart Application, PCT Application No. PCT/CN2014/095823, English Translation of International Search Report dated Sep. 25, 2015, 2 pages.

Foreign Communication From A Counterpart Application, PCT Application No. PCT/CN2014/095823, English Translation of Written Opinion dated Sep. 25, 2015, 6 pages.

Foreign Communication From A Counterpart Application, European Application No. 14909458.3, Extended European Search Report dated Nov. 10, 2017, 13 pages.

* cited by examiner

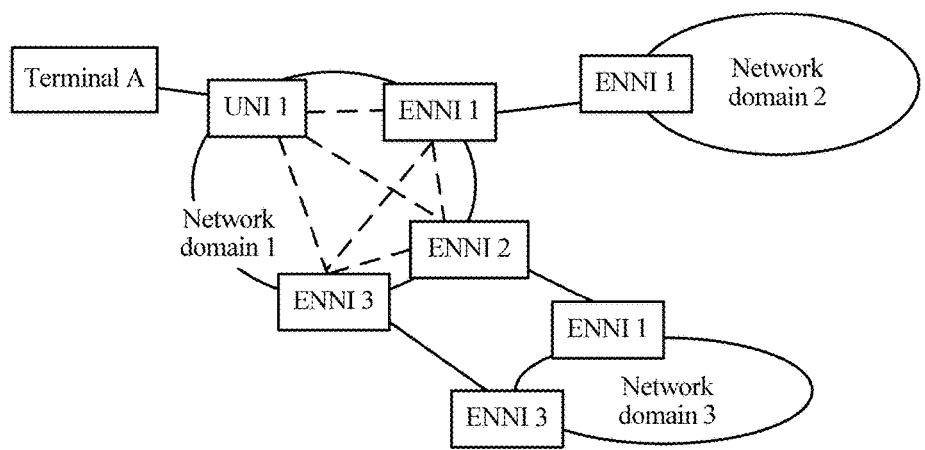
FIG. 6
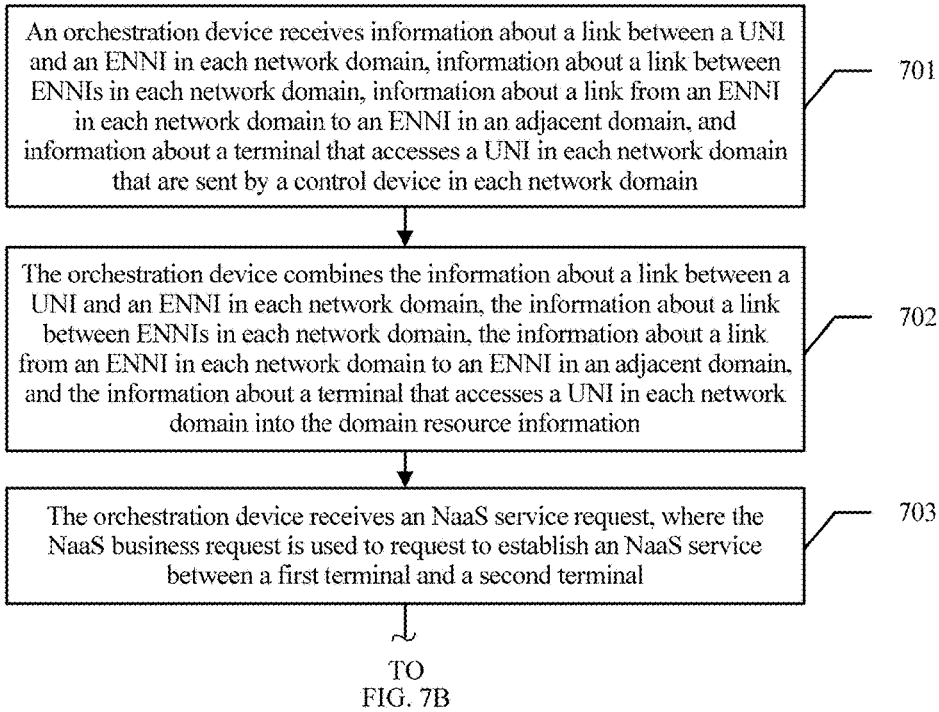
TO
FIG. 7B
FIG. 7A

NETWORK AS SERVICE SERVICE CROSS-DOMAIN ORCHESTRATION METHOD, ORCHESTRATION DEVICE, AND CONTROL DEVICE

CROSS-REFERENCE TO RELATED APPLICATION

This application is a continuation of International Patent Application No. PCT/CN2014/095823, filed on Dec. 31, 2014, the disclosure of which is hereby incorporated by reference in its entirety.

TECHNICAL FIELD

The application relates to the communications field, and in particular, to a Network as a Service (NaaS) service cross-domain orchestration method, an orchestration device, and a control device.

BACKGROUND

With continuous development of new technologies for a network device, a software defined network (SDN) has become a hot topic, and OpenFlow is a typical structure of the SDN. There are two types of devices in an OpenFlow network: a control device (controller) and an OpenFlow switch. The control device is responsible for centralized control in the network, and delivering of a flow table to the OpenFlow switch. In addition, the control device is open to a user, and the OpenFlow switch performs packet matching and forwarding according to the flow table.

It can be learned that the network device evolves into a centralized control architecture in which control is separated from forwarding, and accordingly, a network architecture changes, and this type of architecture further accelerates emergence of multiple SDN-based application forms. Accordingly, an NaaS idea emerges, and automatic deployment of NaaS service is a development trend of a current network service. An NaaS user or an upper-layer application describes an NaaS service requirement, and further converts the service requirement into a network control instruction and a network configuration instruction using a centralized control device, so that a specified network requirement is implemented in a forwarding network. The NaaS user or the upper-layer application does not care about network details, and only needs to describe a connection requirement between required terminals (or terminal groups). An end-to-end NaaS service is a basic requirement feature of all NaaS services.

However, in actual application, for an end-to-end NaaS service requirement, terminals (or terminal groups) may cross multiple geographically distributed network domains. As shown in FIG. 1, FIG. 1 is a schematic diagram of a scenario of a multi-domain network. Each network domain is a closed network system, and an SDN control device in this domain implements control management of intra-domain network resources. Currently, there is no technology for scheduling multiple SDN control domains and inter-domain resources in a multi-domain network that includes multiple network domains, and therefore, it is difficult to implement the foregoing end-to-end NaaS service in the multi-domain network that includes multiple network domains.

SUMMARY

Embodiments of the application provide an NaaS service cross-domain orchestration method, an orchestration device, and a control device, to implement an end-to-end NaaS service in a multi-domain network that includes multiple network domains.

A first aspect of the embodiments of the application provides an NaaS service cross-domain orchestration method, including receiving, by an orchestration device, an NaaS service request, where the NaaS service request is used to request to establish an NaaS service between a first terminal and a second terminal; obtaining, by the orchestration device, information about a first user-to-network interface (UNI) and information about a second UNI in a multi-domain network according to the NaaS service request, where the first UNI is used by the first terminal to access a first network domain, the second UNI is used by the second terminal to access a second network domain, and the multi-domain network includes at least two network domains; querying, by the orchestration device, domain resource information according to the information about the first UNI and the information about the second UNI, to obtain a cross-domain path between the first UNI and the second UNI; determining, by the orchestration device, network domains that the cross-domain path passes through, and obtaining a first connection requirement and a second connection requirement of each network domain of the network domains that the cross-domain path passes through, where the first connection requirement is an intra-domain connection requirement of each network domain, and the second connection requirement is an inter-domain connection requirement between each network domain and an adjacent domain; and separately sending, by the orchestration device, the first connection requirement and the second connection requirement of each network domain to a control device in the network domain, so that the control device in each network domain establishes an NaaS service from the first terminal to the second terminal according to the first connection requirement and the second connection requirement of the network domain; where the domain resource information includes link information of each network domain in the multi-domain network, and the link information of each network domain includes information about a link from a UNI to an external network-to-network interface (ENNI), information about a link from an ENNI to a UNI, information about a link from an ENNI to another ENNI in a same network domain, and information about a link from an ENNI to an ENNI in an adjacent domain.

With reference to the first aspect of the embodiments of the application, in a first implementation manner of the first aspect of the embodiments of the application, before the step of querying domain resource information, the method further includes obtaining, by the orchestration device, a connection relationship between devices in each network domain in the multi-domain network, a connection relationship between a device in each network domain and a device in an adjacent domain, and information about a terminal that accesses a device in each network domain; abstracting, by the orchestration device as a UNI, an interface used for user access in a network domain; abstracting, by the orchestration device as an ENNI, an interface connected to another network domain in a network domain; abstracting, by the orchestration device, each network domain as a virtual node, and using a UNI and an ENNI in each network domain as an interface of the virtual node abstracted from the network domain; abstracting, by the orchestration device, the connection relationship between devices in each network domain in the multi-domain network and the connection relationship between a device in each network domain and a device in an adjacent domain as the link information of each network domain, and abstracting the information about a terminal that accesses a device in each network domain as information about a terminal that accesses each UNI; and combining, by the orchestration device, the link information of each network domain and the information about a terminal that accesses each UNI into the domain resource information.

With reference to the first implementation manner of the first aspect of the embodiments of the application, in a second implementation manner of the first aspect of the embodiments of the application, the obtaining, by the orchestration device, a connection relationship between devices in each network domain in the multi-domain network, a connection relationship between a device in each network domain and an adjacent domain, and information about a terminal that accesses a device in each network domain includes obtaining, by the orchestration device using a network management system, the connection relationship between devices in each network domain in the multi-domain network, the connection relationship between a device in each network domain and an adjacent domain, and the information about a terminal that accesses a device in each network domain; or receiving, by the orchestration device, the connection relationship between devices in each network domain, the connection relationship between a device in each network domain and an adjacent domain, and the information about a terminal that accesses a device in each network domain that are sent by the control device in each network domain.

With reference to the second implementation manner of the first aspect of the embodiments of the application, in a third implementation manner of the first aspect of the embodiments of the application, the separately sending, by the orchestration device, the first connection requirement and the second connection requirement of each network domain to a control device in the network domain includes parsing, by the orchestration device, a UNI or an ENNI in the first connection requirement and the second connection requirement of each network domain as a corresponding physical interface in each network domain; and separately sending, by the orchestration device, the first connection requirement and the second connection requirement of each network domain that are obtained after the parsing to the control device in the network domain.

With reference to the first aspect of the embodiments of the application, in a fourth implementation manner of the first aspect of the embodiments of the application, in the method according to claim 1, before the step of querying domain resource information, the method further includes obtaining, by the orchestration device, the domain resource information using a network management system; or receiving, by the orchestration device, information about a link between a UNI and an ENNI in each network domain, information about a link between ENNIs in each network domain, information about a link from an ENNI in each network domain to an ENNI in an adjacent domain, and information about a terminal that accesses a UNI in each network domain that are sent by the control device in each network domain, and combining the information about a link between a UNI and an ENNI in each network domain, the information about a link between ENNIs in each network domain, the information about a link from an ENNI in each network domain to an ENNI in an adjacent domain, and the information about a terminal that accesses a UNI in each network domain into the domain resource information.

With reference to the fourth implementation manner of the first aspect of the embodiments of the application, in a fifth implementation manner of the first aspect of the embodiments of the application, the separately sending, by the orchestration device, the first connection requirement and the second connection requirement of each network domain to a control device in the network domain includes separately sending, by the orchestration device, a first connection requirement and a second connection requirement of each network domain that include a UNI or an ENNI to the control device in the network domain.

With reference to any one of the first aspect of the embodiments of the application, or the first to the fifth implementation manners of the first aspect, in a sixth implementation manner of the first aspect of the embodiments of the application, the querying, by the orchestration device, domain resource information according to the information about the first UNI and the information about the second UNI, to obtain a cross-domain path between the first UNI and the second UNI includes obtaining, by the orchestration device, the cross-domain path between the first UNI and the second UNI by means of computation according to the information about the first UNI, the information about the second UNI, the domain resource information, and a preset path computation policy, where the preset path computation policy includes minimizing a quantity of network domains that the cross-domain path passes through; or minimizing inter-domain costs when the cross-domain path crosses domains; or ensuring rated inter-domain bandwidth when the cross-domain path traverses domains.

A second aspect of the embodiments of the application provides an orchestration device, including a request receiving module configured to receive an NaaS service request, where the NaaS service request is used to request to establish an NaaS service between a first terminal and a second terminal; a first obtaining module configured to obtain information about a first UNI and information about a second UNI in a multi-domain network according to the NaaS service request received by the request receiving module, where the first UNI is used by the first terminal to access a first network domain, the second UNI is used by the second terminal to access a second network domain, and the multi-domain network includes at least two network domains; a path query module configured to query domain resource information according to the information about the first UNI and the information about the second UNI that are obtained by the first obtaining module, to obtain a cross-domain path between the first UNI and the second UNI, where the domain resource information includes link information of each network domain in the multi-domain network, and the link information of each network domain includes information about a link from a UNI to an ENNI, information about a link from an ENNI to a UNI, information about a link from an ENNI to another ENNI in a same network domain, and information about a link from an ENNI to an ENNI in an adjacent domain; a requirement determining module configured to determine network domains that the cross-domain path passes through, and obtain a first connection requirement and a second connection requirement of each network domain of the network domains that the cross-domain path passes through, where the first connection requirement is an intra-domain connection requirement of each network domain, and the second connection requirement is an inter-domain connection requirement between each network domain and an adjacent domain; and a requirement sending module configured to separately send the first connection requirement and the second connection requirement of each network domain to a control device in the network domain, so that the control device in each network domain establishes an NaaS service from the first terminal to the second terminal according to the first connection requirement and the second connection requirement of the network domain.

With reference to the second aspect of the embodiments of the application, in a first implementation manner of the second aspect of the embodiments of the application, the orchestration device further includes a second obtaining module configured to obtain a connection relationship between devices in each network domain in the multi-domain network, a connection relationship between a device in each network domain and a device in an adjacent domain, and information about a terminal that accesses a device in each network domain; a first abstraction module configured to abstract, as a UNI, an interface used for user access in a network domain; a second abstraction module configured to abstract, as an ENNI, an interface connected to another network domain in a network domain; a third abstraction module configured to abstract each network domain as a virtual node, and use a UNI and an ENNI in each network domain as an interface of the virtual node abstracted from the network domain; a fourth abstraction module configured to abstract the connection relationship between devices in each network domain in the multi-domain network and the connection relationship between a device in each network domain and a device in an adjacent domain as the link information of each network domain, and abstract the information about a terminal that accesses a device in each network domain as information about a terminal that accesses each UNI; and an information combination module configured to combine the link information of each network domain and the information about a terminal that accesses each UNI into the domain resource information.

With reference to the first implementation manner of the second aspect of the embodiments of the application, in a second implementation manner of the second aspect of the embodiments of the application, the second obtaining module is configured to obtain, using a network management system, the connection relationship between devices in each network domain in the multi-domain network, the connection relationship between a device in each network domain and an adjacent domain, and the information about a terminal that accesses a device in each network domain; and/or receive the connection relationship between devices in each network domain, the connection relationship between a device in each network domain and an adjacent domain, and the information about a terminal that accesses a device in each network domain that are sent by the control device in each network domain.

With reference to the second implementation manner of the second aspect of the embodiments of the application, in a third implementation manner of the second aspect of the embodiments of the application, the requirement sending module includes a parsing unit configured to parse a UNI or an ENNI in the first connection requirement and the second connection requirement of each network domain as a corresponding physical interface in each network domain; and a sending unit configured to separately send the first connection requirement and the second connection requirement of each network domain that are obtained after the parsing to the control device in the network domain, so that the control device in each network domain establishes the NaaS service from the first terminal to the second terminal according to the first connection requirement and the second connection requirement of the network domain that are obtained after the parsing.

With reference to the second aspect of the embodiments of the application, in a fourth implementation manner of the second aspect of the embodiments of the application, the orchestration device further includes a third obtaining module configured to obtain the domain resource information using a network management system; and/or a fourth obtaining module configured to receive information about a link between a UNI and an ENNI in each network domain, information about a link between ENNIs in each network domain, information about a link from an ENNI in each network domain to an ENNI in an adjacent domain, and information about a terminal that accesses a UNI in each network domain that are sent by the control device in each network domain, and combine the information about a link between a UNI and an ENNI in each network domain, the information about a link between ENNIs in each network domain, the information about a link from an ENNI in each network domain to an ENNI in an adjacent domain, and the information about a terminal that accesses a UNI in each network domain into the domain resource information.

With reference to the fourth implementation manner of the second aspect of the embodiments of the application, in a fifth implementation manner of the second aspect of the embodiments of the application, the requirement sending module is configured to separately send a first connection requirement and a second connection requirement of each network domain that include a UNI or an ENNI to the control device in the network domain, so that the control device in each network domain establishes an NaaS service from the first terminal to the second terminal according to the first connection requirement and the second connection requirement of the network domain that include a UNI or an ENNI.

With reference to any one of the second aspect of the embodiments of the application, or the first to the fifth implementation manners of the second aspect, in a sixth implementation manner of the second aspect of the embodiments of the application, the path query module is configured to obtain the cross-domain path between the first UNI and the second UNI by means of computation according to the information about the first UNI, the information about the second UNI, the domain resource information, and a preset path computation policy, where the preset path computation policy includes minimizing a quantity of network domains that the cross-domain path passes through; or minimizing inter-domain costs when the cross-domain path crosses domains; or ensuring rated inter-domain bandwidth when the cross-domain path traverses domains.

A third aspect of the embodiments of the application provides an orchestration device, including an input apparatus, an output apparatus, a processor, and a memory, where the processor is configured to perform the following steps by invoking an operation instruction stored in the memory: receiving an NaaS service request, where the NaaS service request is used to request to establish an NaaS service between a first terminal and a second terminal; obtaining information about a first user-to-network interface UNI and information about a second UNI in a multi-domain network according to the NaaS service request, where the first UNI is used by the first terminal to access a first network domain, the second UNI is used by the second terminal to access a second network domain, and the multi-domain network includes at least two network domains; querying domain resource information according to the information about the first UNI and the information about the second UNI, to obtain a cross-domain path between the first UNI and the second UNI; determining network domains that the cross-domain path passes through, and obtaining a first connection requirement and a second connection requirement of each network domain of the network domains that the cross-domain path passes through, where the first connection requirement is an intra-domain connection requirement of each network domain, and the second connection requirement is an inter-domain connection requirement between each network domain and an adjacent domain; and separately sending the first connection requirement and the second connection requirement of each network domain to a control device in the network domain, so that the control device in each network domain establishes an NaaS service from the first terminal to the second terminal according to the first connection requirement and the second connection requirement of the network domain; where the domain resource information includes link information of each network domain in the multi-domain network, and the link information of each network domain includes information about a link from a UNI to an ENNI, information about a link from an ENNI to a UNI, information about a link from an ENNI to another ENNI in a same network domain, and information about a link from an ENNI to an ENNI in an adjacent domain.

With reference to the third aspect of the embodiments of the application, in a first implementation manner of the third aspect of the embodiments of the application, the processor is further configured to perform the following steps: obtaining a connection relationship between devices in each network domain in the multi-domain network, a connection relationship between a device in each network domain and a device in an adjacent domain, and information about a terminal that accesses a device in each network domain; abstracting, as a UNI, an interface used for user access in a network domain; abstracting, as an ENNI, an interface connected to another network domain in a network domain; abstracting each network domain as a virtual node, and using a UNI and an ENNI in each network domain as an interface of the virtual node abstracted from the network domain; abstracting the connection relationship between devices in each network domain in the multi-domain network and the connection relationship between a device in each network domain and a device in an adjacent domain as the link information of each network domain, and abstracting the information about a terminal that accesses a device in each network domain as information about a terminal that accesses each UNI; and combining the link information of each network domain and the information about a terminal that accesses each UNI into the domain resource information.

With reference to the first implementation manner of the third aspect of the embodiments of the application, in a second implementation manner of the third aspect of the embodiments of the application, when performing the step of obtaining a connection relationship between devices in each network domain in the multi-domain network, a connection relationship between a device in each network domain and a device in an adjacent domain, and information about a terminal that accesses a device in each network domain, the processor is configured to perform the following step: obtaining, using a network management system, the connection relationship between devices in each network domain in the multi-domain network, the connection relationship between a device in each network domain and an adjacent domain, and the information about a terminal that accesses a device in each network domain; or receiving the connection relationship between devices in each network domain, the connection relationship between a device in each network domain and an adjacent domain, and the information about a terminal that accesses a device in each network domain that are sent by the control device in each network domain.

With reference to the second implementation manner of the third aspect of the embodiments of the application, in a third implementation manner of the third aspect of the embodiments of the application, when performing the step of separately sending the first connection requirement and the second connection requirement of each network domain to a control device in the network domain, the processor is configured to perform the following steps: parsing a UNI or an ENNI in the first connection requirement and the second connection requirement of each network domain as a corresponding physical interface in each network domain; and separately sending the first connection requirement and the second connection requirement of each network domain that are obtained after the parsing to the control device in the network domain.

With reference to the third aspect of the embodiments of the application, in a fourth implementation manner of the third aspect of the embodiments of the application, the processor is further configured to perform the following step: obtaining the domain resource information using a network management system; and/or receiving information about a link between a UNI and an ENNI in each network domain, information about a link between ENNIs in each network domain, information about a link from an ENNI in each network domain to an ENNI in an adjacent domain, and information about a terminal that accesses a UNI in each network domain that are sent by the control device in each network domain, and combining the information about a link between a UNI and an ENNI in each network domain, the information about a link between ENNIs in each network domain, the information about a link from an ENNI in each network domain to an ENNI in an adjacent domain, and the information about a terminal that accesses a UNI in each network domain into the domain resource information.

With reference to the fourth implementation manner of the third aspect of the embodiments of the application, in a fifth implementation manner of the third aspect of the embodiments of the application, when performing a step of sending an end-to-end service requirement of each network domain and a connection requirement between each network domain and an adjacent domain to a control device in a corresponding network domain, the processor is configured to perform the following step: sending, to the control device in the corresponding network domain, the end-to-end service requirement of each network domain and the connection requirement between each network domain and an adjacent domain, where the end-to-end service requirement and the connection requirement include a UNI or an ENNI.

With reference to any one of the third aspect of the embodiments of the application, or the first to the fifth implementation manners of the third aspect, in a sixth implementation manner of the third aspect of the embodiments of the application, when performing the step of querying domain resource information according to the information about the first UNI and the information about the second UNI, to obtain a cross-domain path between the first UNI and the second UNI, the processor is configured to perform the following step: obtaining the cross-domain path between the first UNI and the second UNI by means of computation according to the information about the first UNI, the information about the second UNI, the domain resource information, and a preset path computation policy, where the preset path computation policy includes minimizing a quantity of network domains that the cross-domain path passes through; or minimizing inter-domain costs when the cross-domain path crosses domains; or ensuring rated inter-domain bandwidth when the cross-domain path traverses domains.

A fourth aspect of the embodiments of the application provides an NaaS service cross-domain orchestration method, including receiving, by a control device, a first connection requirement and a second connection requirement of a network domain that are delivered by an orchestration device, where the first connection is an intra-domain connection requirement of the network domain, and the second connection requirement is an inter-domain connection requirement between the network domain and an adjacent domain; establishing, by the control device, an intra-domain data connection in the network domain according to the first connection requirement; and establishing, by the control device, an inter-domain data connection between the network domain and the adjacent domain according to the second connection requirement.

With reference to the fourth aspect of the embodiments of the application, in a first implementation manner of the fourth aspect of the embodiments of the application, the method further includes collecting, by the control device, a connection relationship between devices in the network domain, a connection relationship between a device and the adjacent domain, and information about a terminal that accesses a device; abstracting, by the control device as a UNI, an interface used for user access in the network domain; abstracting, by the control device as an ENNI, an interface connected to the adjacent domain in the network domain; abstracting, by the control device, the network domain as a virtual node, and using the abstracted UNI and the abstracted ENNI as an interface of the virtual node; abstracting, by the control device, the connection relationship between devices in the network domain as information about a link between a UNI and an ENNI in the network domain and information about a link between ENNIs in the network domain, abstracting the connection relationship between a device in the network domain and the adjacent domain as information about a link between an ENNI in the network domain and an ENNI in the adjacent domain, and abstracting the information about a terminal that accesses a device as information about a terminal that accesses a UNI; and sending, by the control device to the orchestration device, the abstracted information about a link between a UNI and an ENNI in the network domain, the abstracted information about a link between ENNIs in the network domain, the abstracted information about a link between an ENNI in the network domain and an ENNI in the adjacent domain, and the abstracted information about a terminal that accesses a UNI.

With reference to the first implementation manner of the fourth aspect of the embodiments of the application, in a second implementation manner of the fourth aspect of the embodiments of the application, the establishing, by the control device, an intra-domain data connection in the network domain according to the first connection requirement includes parsing, by the control device, a UNI or an ENNI in the first connection requirement as a physical interface in the network domain; and establishing, by the control device according to the first connection requirement, a data connection between physical interfaces obtained by means of parsing; and the establishing, by the control device, an inter-domain data connection between the network domain and the adjacent domain according to the second connection requirement includes parsing, by the control device, an ENNI in the second connection requirement as a physical interface in the network domain or a physical interface in the adjacent domain; and establishing, by the control device according to the second connection requirement, a data connection between the physical interface in the network domain and the physical interface in the adjacent domain that are obtained by means of parsing.

With reference to the fourth aspect of the embodiments of the application, in a third implementation manner of the fourth aspect of the embodiments of the application, the method further includes collecting, by the control device, a connection relationship between devices in the network domain, a connection relationship between a device and the adjacent domain, and information about a terminal that accesses a device; and sending, by the control device to the orchestration device, the collected connection relationship between devices, the collected connection relationship between a device and the adjacent domain, and the collected information about a terminal that accesses a device.

With reference to the third implementation manner of the fourth aspect of the embodiments of the application, in a fourth implementation manner of the fourth aspect of the embodiments of the application, the establishing, by the control device, an intra-domain data connection in the network domain according to the first connection requirement includes establishing, by the control device according to the first connection requirement that includes physical interfaces in the network domain, a data connection between the physical interfaces in the first connection requirement; and the establishing, by the control device, an inter-domain data connection between the network domain and the adjacent domain according to the second connection requirement includes establishing, by the control device according to the second connection requirement that includes a physical interface in the network domain and a physical interface in the adjacent domain, a data connection between the physical interface in the network domain and the physical interface in the adjacent domain.

A fifth aspect of the embodiments of the application provides a control device, including a requirement receiving module configured to receive a first connection requirement and a second connection requirement of a network domain that are delivered by an orchestration device, where the first connection is an intra-domain connection requirement of the network domain, and the second connection requirement is an inter-domain connection requirement between the network domain and an adjacent domain; a first establishment module configured to establish an intra-domain data connection in the network domain according to the first connection requirement; and a second establishment module configured to establish an inter-domain data connection between the network domain and the adjacent domain according to the second connection requirement.

With reference to the fifth aspect of the embodiments of the application, in a first implementation manner of the fifth aspect of the embodiments of the application, the control device further includes an information collection module configured to collect a connection relationship between devices in the network domain, a connection relationship between a device and the adjacent domain, and information about a terminal that accesses a device; a fifth abstraction module configured to abstract, as a UNI, an interface used for user access in the network domain; a sixth abstraction module configured to abstract, as an ENNI, an interface connected to the adjacent domain in the network domain; a seventh abstraction module configured to abstract the network domain as a virtual node, and use the abstracted UNI and the abstracted ENNI as an interface of the virtual node; an eighth abstraction module configured to abstract the connection relationship between devices in the network domain as information about a link between a UNI and an ENNI in the network domain and information about a link between ENNIs in the network domain, abstract the connection relationship between a device in the network domain and the adjacent domain as information about a link between an ENNI in the network domain and an ENNI in the adjacent domain, and abstract the information about a terminal that accesses a device as information about a terminal that accesses a UNI; and a link information sending module configured to send, to the orchestration device, the abstracted information about a link between a UNI and an ENNI in the network domain, the abstracted information about a link between ENNIs in the network domain, the abstracted information about a link between an ENNI in the network domain and an ENNI in the adjacent domain, and the abstracted information about a terminal that accesses a UNI.

With reference to the first implementation manner of the fifth aspect of the embodiments of the application, in a second implementation manner of the fifth aspect of the embodiments of the application, the first establishment module includes a first parsing unit configured to parse a UNI or an ENNI in the first connection requirement as a physical interface in the network domain; and a first establishment unit configured to establish, according to the first connection requirement, a data connection between physical interfaces obtained by means of parsing; and the second establishment module includes a second parsing unit configured to parse an ENNI in the second connection requirement as a physical interface in the network domain or a physical interface in the adjacent domain; and a second establishment unit configured to establish, according to the second connection requirement, a data connection between the physical interface in the network domain and the physical interface in the adjacent domain that are obtained by means of parsing.

With reference to the fifth aspect of the embodiments of the application, in a third implementation manner of the fifth aspect of the embodiments of the application, the control device further includes an information collection module configured to collect a connection relationship between devices in the network domain, a connection relationship between a device and the adjacent domain, and information about a terminal that accesses a device; and a connection information sending module configured to send, to the orchestration device, the connection relationship between devices, the connection relationship between a device and the adjacent domain, and the information about a terminal that accesses a device that are collected by the information collection module.

With reference to the third implementation manner of the fifth aspect of the embodiments of the application, in a fourth implementation manner of the fifth aspect of the embodiments of the application, the first establishment module is configured to establish, according to the first connection requirement that includes physical interfaces in the network domain, a data connection between the physical interfaces in the first connection requirement; and the second establishment module is configured to establish, according to the second connection requirement that includes a physical interface in the network domain and a physical interface in the adjacent domain, a data connection between the physical interface in the network domain and the physical interface in the adjacent domain.

A sixth aspect of the embodiments of the application provides a control device, including an input apparatus, an output apparatus, a processor, and a memory, where the processor is configured to perform the following steps by invoking an operation instruction stored in the memory: receiving a first connection requirement and a second connection requirement of a network domain that are delivered by an orchestration device, where the first connection is an intra-domain connection requirement of the network domain, and the second connection requirement is an inter-domain connection requirement between the network domain and an adjacent domain; establishing an intra-domain data connection in the network domain according to the first connection requirement; and establishing an inter-domain data connection between the network domain and the adjacent domain according to the second connection requirement.

With reference to the sixth aspect of the embodiments of the application, in a first implementation manner of the sixth aspect of the embodiments of the application, the processor is further configured to perform the following steps: collecting a connection relationship between devices in the network domain, a connection relationship between a device and the adjacent domain, and information about a terminal that accesses a device; abstracting, as a UNI, an interface used for user access in the network domain; abstracting, as an ENNI, an interface connected to the adjacent domain in the network domain; abstracting the network domain as a virtual node, and using the abstracted UNI and the abstracted ENNI as an interface of the virtual node; abstracting the connection relationship between devices in the network domain as information about a link between a UNI and an ENNI in the network domain and information about a link between ENNIs in the network domain, abstracting the connection relationship between a device in the network domain and the adjacent domain as information about a link between an ENNI in the network domain and an ENNI in the adjacent domain, and abstracting the information about a terminal that accesses a device as information about a terminal that accesses a UNI; and sending, to the orchestration device, the abstracted information about a link between a UNI and an ENNI in the network domain, the abstracted information about a link between ENNIs in the network domain, the abstracted information about a link between an ENNI in the network domain and an ENNI in the adjacent domain, and the abstracted information about a terminal that accesses a UNI.

With reference to the first implementation manner of the sixth aspect of the embodiments of the application, in a second implementation manner of the sixth aspect of the embodiments of the application, when performing the step of establishing an intra-domain data connection in the network domain according to the first connection requirement, the processor performs the following steps: parsing a UNI or an ENNI in the first connection requirement as a physical interface in the network domain; and establishing, according to the first connection requirement, a data connection between physical interfaces obtained by means of parsing; and when performing the step of establishing an inter-domain data connection between the network domain and the adjacent domain according to the second connection requirement, the processor performs the following steps: parsing an ENNI in the second connection requirement as a physical interface in the network domain or a physical interface in the adjacent domain; and establishing, according to the second connection requirement, a data connection between the physical interface in the network domain and the physical interface in the adjacent domain that are obtained by means of parsing.

With reference to the sixth aspect of the embodiments of the application, in a third implementation manner of the sixth aspect of the embodiments of the application, the processor is further configured to perform the following steps: collecting a connection relationship between devices in the network domain, a connection relationship between a device and the adjacent domain, and information about a terminal that accesses a device; and sending, to the orchestration device, the collected connection relationship between devices, the collected connection relationship between a device and the adjacent domain, and the collected information about a terminal that accesses a device.

With reference to the third implementation manner of the sixth aspect of the embodiments of the application, in a fourth implementation manner of the sixth aspect of the embodiments of the application, when performing the step of establishing an intra-domain data connection in the network domain according to the first connection requirement, the processor performs the following step: establishing, according to the first connection requirement that includes physical interfaces in the network domain, a data connection between the physical interfaces in the first connection requirement; and when performing the step of establishing an inter-domain data connection between the network domain and the adjacent domain according to the second connection requirement, the processor performs the following step: establishing, according to the second connection requirement that includes a physical interface in the network domain and a physical interface in the adjacent domain, a data connection between the physical interface in the network domain and the physical interface in the adjacent domain.

It may be learned from the foregoing technical solutions that the embodiments of the application have the following advantages. In the embodiments of the application, an orchestration device obtains information about a first UNI and information about a second UNI in a multi-domain network according to a received NaaS service request, where the NaaS service request is used to request to establish an NaaS service between a first terminal and a second terminal, the first UNI is used by the first terminal to access a first network domain, and the second UNI is used by the second terminal to access a second network domain. The orchestration device queries domain resource information according to the information about the first UNI and the information about the second UNI, to obtain a cross-domain path between the first UNI and the second UNI. It may be understood that because the first terminal accesses the first network domain using the first UNI, and the second terminal accesses the second network domain using the second UNI, the cross-domain path is a cross-domain path between the first terminal and the second terminal. The orchestration device determines network domains that the cross-domain path passes through, and obtains a first connection requirement and a second connection requirement of each network domain of the network domains that the cross-domain path passes through, where the first connection requirement is an intra-domain connection requirement of each network domain, and the second connection requirement is an inter-domain connection requirement between each network domain and an adjacent domain. It may be understood that when first connection requirements and second connection requirements of all network domains on the cross-domain path are met, the cross-domain path is connected. The orchestration device sends the first connection requirement and the second connection requirement of each network domain on the cross-domain path to a control device in the network domain, so that the control device in each network domain establishes a data connection according to the received first connection requirement and the received second connection requirement of the network domain. Finally, in all the network domains on the cross-domain path, data connections are established according to the first connection requirements and the second connection requirements of all the network domains, that is, an NaaS service from the first terminal to the second terminal is established by means of combination. In this way, a cross-domain end-to-end NaaS service that crosses multiple network domains is divided into connection requirements to be performed in the network domains, so that control devices in the network domains cooperate with each other. In each network domain, only a delivered first connection requirement and a delivered second connection requirement of the network domain need to be processed, and finally, the end-to-end NaaS service in the multi-domain network that includes multiple network domains is implemented.

BRIEF DESCRIPTION OF THE DRAWINGS

FIG. 6 is a schematic diagram of domain resource information of a network domain according to an embodiment of the application;

FIG. 7A and FIG. 7B are another schematic flowchart of an NaaS service cross-domain orchestration method according to an embodiment of the application;

DETAILED DESCRIPTION

The following clearly and describes the technical solutions in the embodiments of the application with reference to the accompanying drawings in the embodiments of the application. The described embodiments are merely some but not all of the embodiments of the application. All other embodiments obtained by persons skilled in the art based on the embodiments of the application without creative efforts shall fall within the protection scope of the application.

The term "multi-domain network" represents a network that includes at least two network domains.

The term "adjacent domain" represents a network domain that is connected to an adjacent network domain.

The term "UNI" represents an interface used by a user to access a network domain, and is a demarcation point between a user and a network domain.

The term "ENNI" represents an interface between network domains, and is a demarcation point between a network domain and another network domain.

The term "link information" represents information about a connection between a UNI interface or an ENNI interface and another UNI interface or another ENNI interface, and the link information may include a link direction, information about UNI interfaces or ENNI interfaces at both ends of a link, and may further include information such as link costs, bandwidth, and the like. The UNI interface information or the ENNI interface information includes an identifier of a physical device in which the UNI interface or the ENNI interface is located, an identifier of a physical interface, an identifier of a network domain to which the UNI interface or the ENNI interface belongs, and the like.

It may be understood that the NaaS service cross-domain orchestration method involves two execution bodies from two perspectives. One is an orchestration device for coordinating all network domains in an entire multi-domain network, and the other is a control device in each network domain. From two perspectives, the following describes the NaaS service cross-domain orchestration method in the embodiments of the application by separately using the two devices as the execution bodies.

1. An orchestration device is used as an execution body. It should be noted that the orchestration device in the embodiments of the application may have many other names. For example, the orchestration device may also be referred to as an orchestrator. This is not limited herein.

Figure 1:
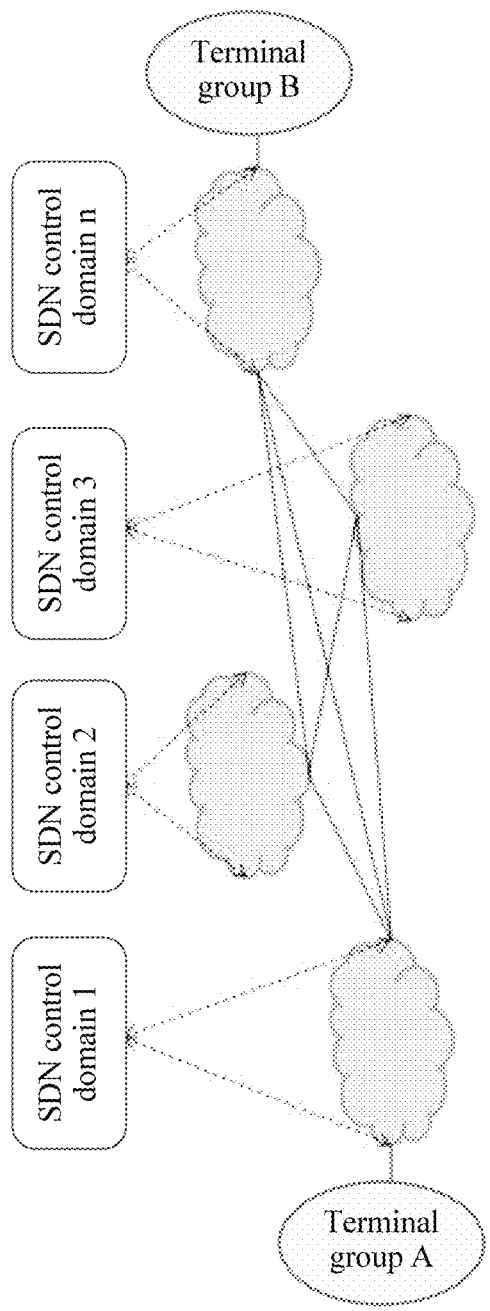
FIG. 1 is a schematic diagram of a scenario of a multi-domain network according to an embodiment of the application.
Figure 2:
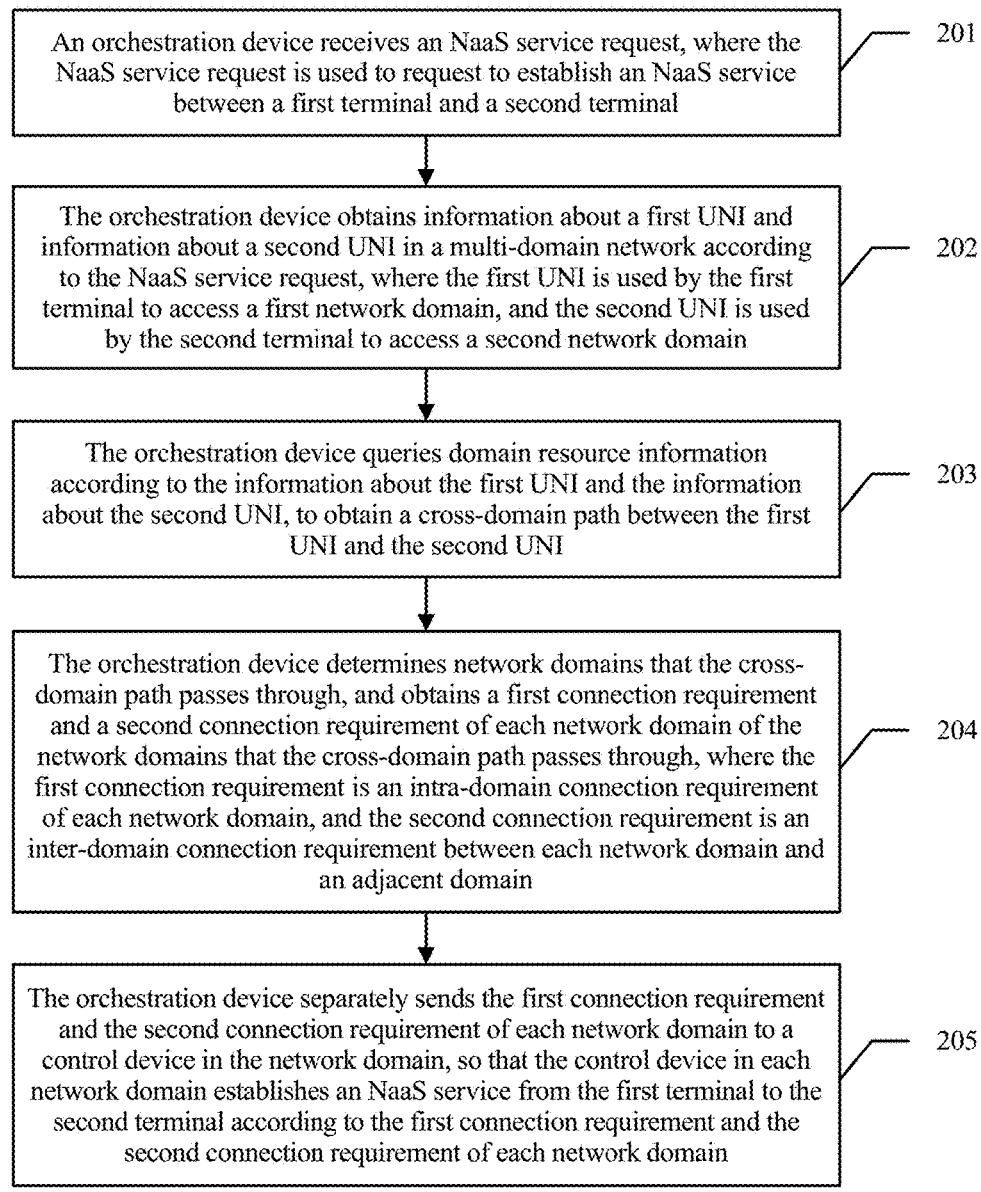
FIG. 2 is a schematic flowchart of an NaaS service cross-domain orchestration method according to an embodiment of the application.

Referring to FIG. 2, an embodiment of an NaaS service cross-domain orchestration method in an embodiment of the application includes the following steps.

201. An orchestration device receives an NaaS service request, where the NaaS service request is used to request to establish an NaaS service between a first terminal and a second terminal.

In a multi-domain network that includes multiple network domains, the orchestration device may receive an end-to-end NaaS service request sent by an NaaS user or an upper-layer application, and the NaaS service request is used to request to establish the NaaS service between the first terminal and the second terminal.

It may be understood that both the first terminal and the second terminal may be an independent terminal, or may be a terminal group that includes multiple terminals. This is not limited herein.

It may be understood that the multi-domain network not only includes each network domain, but also may include related devices such as an orchestration device in the multi-domain network and a control device in each network domain.

202. The orchestration device obtains information about a first UNI and information about a second UNI in a multi-domain network according to the NaaS service request, where the first UNI is used by the first terminal to access a first network domain, and the second UNI is used by the second terminal to access a second network domain.

After receiving the NaaS service request, the orchestration device obtains the information about the first UNI and the information about the second UNI in the multi-domain network according to the NaaS service request, where the first UNI is used by the first terminal to access the first network domain in the multi-domain network, and the second UNI is used by the second terminal to access the second network domain in the multi-domain network. It may be understood that the first network domain and the second network domain are not a same network domain.

203. The orchestration device queries domain resource information according to the information about the first UNI and the information about the second UNI, to obtain a cross-domain path between the first UNI and the second UNI.

The orchestration device queries the domain resource information according to the obtained information about the first UNI and the obtained information about the second UNI, to obtain the cross-domain path between the first UNI and the second UNI.

It should be noted that the domain resource information includes link information of each network domain in the multi-domain network, and the link information of each network domain includes information about a link from a UNI to an ENNI, information about a link from an ENNI to a UNI, information about a link from an ENNI to another ENNI in a same network domain, and information about a link from an ENNI to an ENNI in an adjacent domain.

An UNI represents an interface for accessing a network domain by a user, and is a demarcation point between a user and a network domain. For example, in a network domain, a user that accesses a UNI interface may be a terminal device, or a customer edge (CE), and the UNI may be connected to an ENNI in the network domain. An ENNI represents an interface between network domains, and is a demarcation point between a network domain and another network domain. For example, in a network domain, an ENNI may be connected to an ENNI in an adjacent domain, may be connected to an ENNI in the network domain, or may be connected to a UNI in the network domain. It may be understood that the connection herein not only represents a direct connection by a physical line, but also includes a logical connection relationship, such as a connection by multiple intermediate devices. This is not limited herein. Link information not only includes information about a connection between a UNI interface or an ENNI interface and another UNI interface or another ENNI interface, but also includes information about UNI interfaces or ENNI interfaces at two ends of a link.

The domain resource information includes the link information of each network domain, where a link from a UNI to an ENNI or from an ENNI to a UNI is an intra-domain connection, and a link from an ENNI in a network domain to an ENNI in another network domain is an inter-domain connection. Therefore, at least one cross-domain path from the first UNI to the second UNI may be found according to the information about the first UNI and the information about the second UNI, and in this case, the first terminal may access a network domain using the first UNI, and pass through the cross-domain path to connect to the second UNI that is accessed by the second terminal. A node order of the cross-domain path is the first UNI→an ENNI in a network domain in which the first UNI is located→an ENNI in another domain→an ENNI in a network domain in which the second UNI is located→the second UNI.

204. The orchestration device determines network domains that the cross-domain path passes through, and obtains a first connection requirement and a second connection requirement of each network domain of the network domains that the cross-domain path passes through, where the first connection requirement is an intra-domain connection requirement of each network domain, and the second connection requirement is an inter-domain connection requirement between each network domain and an adjacent domain.

After obtaining the cross-domain path between the first UNI and the second UNI, the orchestration device determines the network domains that the cross-domain path passes through, and obtains the first connection requirement and the second connection requirement of each network domain of the network domains that the cross-domain path passes through, where the first connection requirement is an intra-domain connection requirement of each network domain, and the second connection requirement is an inter-domain connection requirement between each network domain and an adjacent domain.

205. The orchestration device separately sends the first connection requirement and the second connection requirement of each network domain to a control device in the network domain, so that the control device in each network domain establishes an NaaS service from the first terminal to the second terminal according to the first connection requirement and the second connection requirement of the network domain.

After obtaining the first connection requirement and the second connection requirement of each network domain on the cross-domain path, the orchestration device sends the first connection requirement and the second connection requirement to a control device in a corresponding network domain, so that the control device in each network domain establishes an intra-domain data connection in the network domain and an inter-domain data connection between the network domain and an adjacent domain according to the first connection requirement and the second connection requirement, and finally completes establishment of the NaaS service from the first terminal to the second terminal.

In this embodiment of the application, an orchestration device obtains information about a first UNI and information about a second UNI in a multi-domain network according to a received NaaS service request, where the NaaS service request is used to request to establish an NaaS service between a first terminal and a second terminal, the first UNI is used by the first terminal to access a first network domain, and the second UNI is used by the second terminal to access a second network domain. The orchestration device queries domain resource information according to the information about the first UNI and the information about the second UNI, to obtain a cross-domain path between the first UNI and the second UNI. It may be understood that because the first terminal accesses the first network domain using the first UNI, and the second terminal accesses the second network domain using the second UNI, the cross-domain path is a cross-domain path between the first terminal and the second terminal. The orchestration device determines network domains that the cross-domain path passes through, and obtains a first connection requirement and a second connection requirement of each network domain of the network domains that the cross-domain path passes through, where the first connection requirement is an intra-domain connection requirement of each network domain, and the second connection requirement is an inter-domain connection requirement between each network domain and an adjacent domain. It may be understood that when first connection requirements and second connection requirements of all network domains on the cross-domain path are met, the cross-domain path is connected. The orchestration device sends the first connection requirement and the second connection requirement of each network domain on the cross-domain path to a control device in the network domain, so that the control device in each network domain establishes a data connection according to the received first connection requirement and the received second connection requirement of the network domain. Finally, in all the network domains on the cross-domain path, data connections are established according to the first connection requirements and the second connection requirements of all the network domains, that is, an NaaS service from the first terminal to the second terminal is established by means of combination. In this way, a cross-domain end-to-end NaaS service that crosses multiple network domains is divided into connection requirements to be performed in the network domains, so that control devices in the network domains cooperate with each other. In each network domain, only a delivered first connection requirement and a delivered second connection requirement of the network domain need to be processed, and finally, the end-to-end NaaS service in the multi-domain network that includes multiple network domains is implemented.

In the foregoing embodiment, the orchestration device queries the domain resource information to obtain the cross-domain path between the first UNI and the second UNI. The domain resource information includes an abstracted topology of the multi-domain network, is represented using information about a link between an abstracted UNI interface and an abstracted ENNI interface, and does not need to include connection relationships between all physical interfaces of all physical devices in the entire multi-domain network. In actual application, a full-mesh physical topology of the multi-domain network is abstracted as the domain resource information, which may be completed by the orchestration apparatus, or another device such as a control device. The following describes the NaaS service cross-domain orchestration method in this embodiment of the application by separately describing two cases: abstracting the domain resource information by the orchestration apparatus and directly obtaining the domain resource information by the orchestration apparatus.

1. Domain resource information is abstracted by an orchestration apparatus.

Figure 3A:
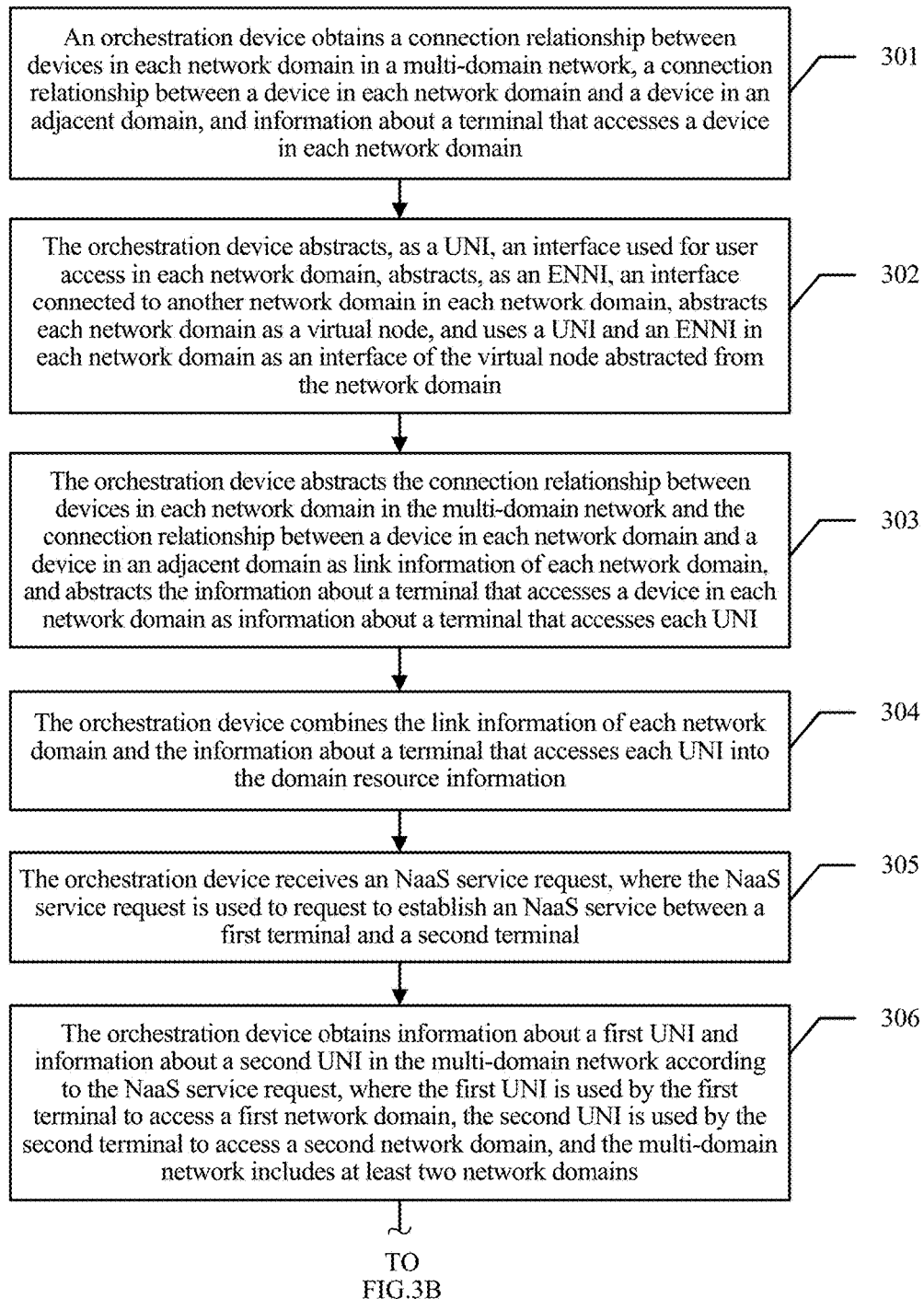
FIG. 3A and FIG. 3B are another schematic flowchart of an NaaS service cross-domain orchestration method according to an embodiment of the application.
Figure 3B:
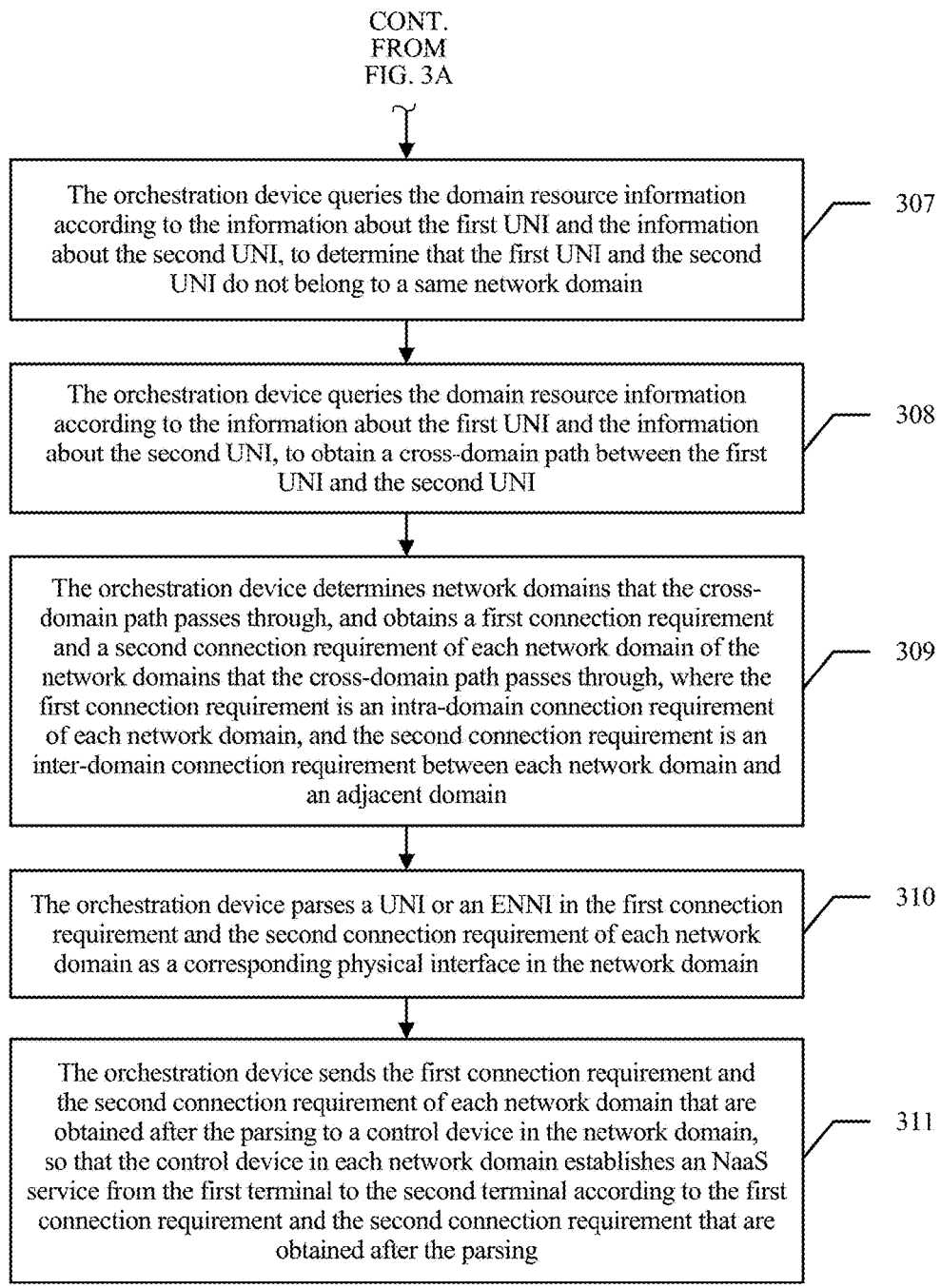

Referring to FIG. 3A and FIG. 3B, another embodiment of an NaaS service cross-domain orchestration method in an embodiment of the application includes the following steps.

301. An orchestration device obtains a connection relationship between devices in each network domain in a multi-domain network, a connection relationship between a device in each network domain and a device in an adjacent domain, and information about a terminal that accesses a device in each network domain.

When accessing the multi-domain network that includes multiple network domains, the orchestration device may obtain the connection relationship between devices in each network domain in the multi-domain network, the connection relationship between a device in each network domain and a device in an adjacent domain, and the information about a terminal that accesses a device in each network domain.

The information about a terminal that accesses a device may include location information of the terminal, an identifier number of the terminal, an IP address of the terminal, and the like, and may further include more other information. This is not limited herein.

It may be understood that the obtaining a connection relationship between devices in each network domain may be obtaining a connection relationship between a first device in each network domain and a second device that is located in the same network domain with the first device, and a connection relationship between second devices in a same network domain, where the first device is a device used for user access, and the second device is a device connected to a device in an adjacent domain.

It may be understood that the orchestration device may obtain the connection relationship between devices in each network domain, the connection relationship between a device in each network domain and a device in an adjacent domain, and the information about a terminal that accesses a device in each network domain in multiple manners.

Optionally, the connection relationship between devices in each network domain in the multi-domain network, the connection relationship between a device in each network domain and an adjacent domain, and the information about a terminal that accesses a device in each network domain may be obtained using a network management system.

Optionally, the connection relationship between devices in each network domain, the connection relationship between a device in each network domain and an adjacent domain, and the information about a terminal that accesses a device in each network domain that are sent by a control device in each network domain may be received.

Alternatively, there may be many other manners, which are not limited herein.

Figure 4:
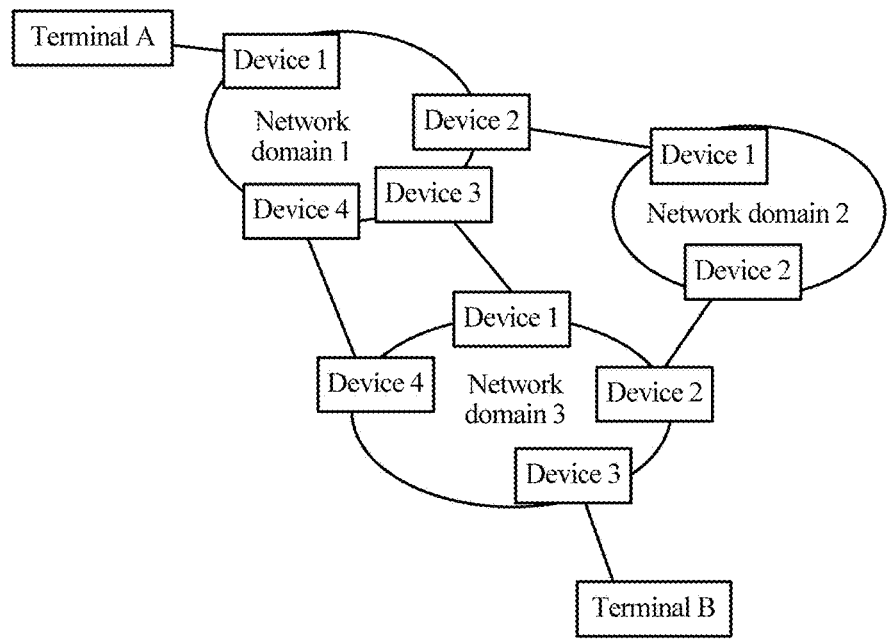
FIG. 4 is a schematic diagram of an instance of a multi-domain network according to an embodiment of the application.

For example, FIG. 4 shows a multi-domain network that includes three network domains. The orchestration device may learn that a terminal A accesses a device 1 in a network domain 1, a device 2 in the network domain 1 is connected to a device 1 in an adjacent network domain 2, a device 3 in the network domain 1 is connected to a device 1 in an adjacent network domain 3, a device 4 in the network domain 1 is connected to a device 4 in the adjacent network domain 3, the device 1 in the network domain 2 is connected to the device 2 in the adjacent network domain 1, a device 2 in the network domain 2 is connected to a device 2 in the adjacent network domain 3, the device 1 in the network domain 3 is connected to the device 3 in the adjacent network domain 1, the device 2 in the network domain 3 is connected to the device 2 in the adjacent network domain 2, the device 4 in the network domain 3 is connected to the device 4 in the adjacent network domain 1, and a terminal B accesses a device 3 in the network domain 3. In addition, the orchestration device may further obtain information about the terminal A and information about the terminal B. It may be understood that each device is accessed by a terminal or is connected to another device using an interface on the device.

302. The orchestration device abstracts, as a UNI, an interface used for user access in each network domain, abstracts, as an ENNI, an interface connected to another network domain in each network domain, abstracts each network domain as a virtual node, and uses a UNI and an ENNI in each network domain as an interface of the virtual node abstracted from the network domain.

After obtaining the connection relationship between devices in each network domain in the multi-domain network, the connection relationship between a device in each network domain and a device in an adjacent domain, and the information about a terminal that accesses a device in each network domain, the orchestration apparatus abstracts, as a UNI, the interface used for user access, abstracts, as an ENNI, the interface connected to another network domain in each network domain, abstracts each network domain as a virtual node, and uses a UNI and an ENNI in each network domain as an interface of the virtual node abstracted from the network domain.

Figure 5:
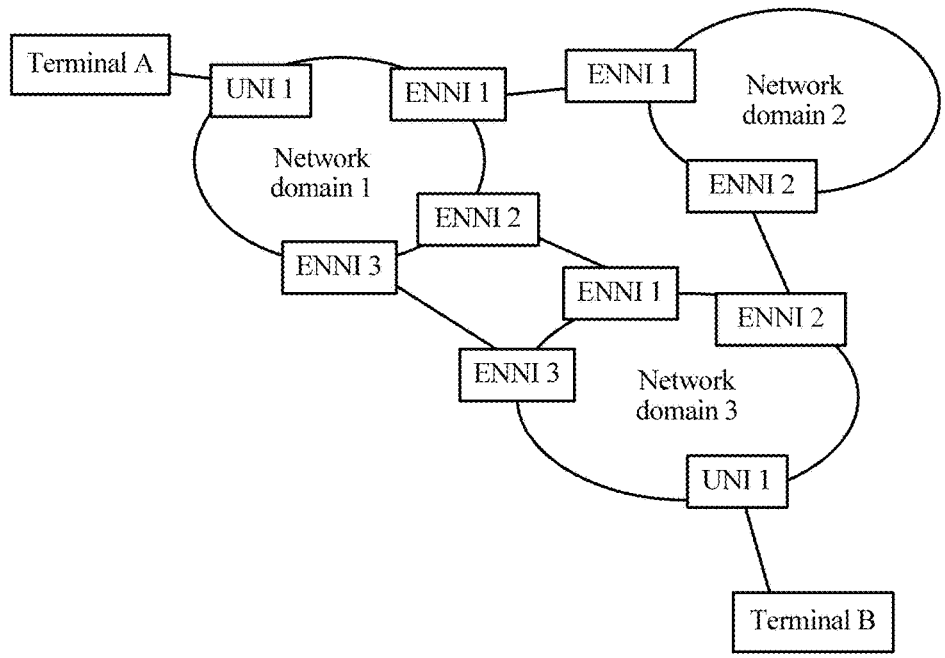
FIG. 5 is a schematic diagram of domain resource information in a multi-domain network according to an embodiment of the application.

For example, as shown in FIG. 5, an interface that is on the device 1 in the network domain 1 in the multi-domain network and that is accessed by the terminal A shown in FIG. 4 is abstracted as a UNI1, an interface that is on the device 2 in the network domain 1 and that is connected to the network domain 2 is abstracted as an ENNI1, an interface that on in the device 3 in the network domain 1 and that is connected to the network domain 3 is abstracted as an ENNI2, an interface that is on the device 4 in the network domain 1 and that is connected to the network domain 3 is abstracted as an ENNI3, and the network domain 1 may be further abstracted as a virtual node 1. The abstracted UNI1, ENNI1, ENNI2, and ENNI3 in the network domain 1 are used as an interface of the virtual node 1. The network domain 2 and the network domain 3 may be abstracted in a same manner, and details are not described herein repeatedly.

303. The orchestration device abstracts the connection relationship between devices in each network domain in the multi-domain network and the connection relationship between a device in each network domain and a device in an adjacent domain as link information of each network domain, and abstracts the information about a terminal that accesses a device in each network domain as information about a terminal that accesses each UNI.

After abstracting the UNI and the ENNI in each network domain, the orchestration apparatus abstracts the connection relationship between devices in each network domain in the multi-domain network and the connection relationship between a device in each network domain and a device in an adjacent domain as the link information of each network domain, and abstracts the information about a terminal that accesses a device in each network domain as the information about a terminal that accesses each UNI. The link information of each network domain includes information about a link from a UNI to an ENNI, information about a link from an ENNI to a UNI, information about a link from an ENNI to another ENNI in a same network domain, and information about a link from an ENNI to an ENNI in an adjacent domain.

It should be noted that when the connection relationship between devices is abstracted as information about a link between a UNI and an ENNI, in addition to a link direction and information about UNI interfaces or ENNI interfaces at two ends of a link, the link information includes information such as link costs and bandwidth. The UNI interface information or the ENNI interface information includes an identifier of a physical device in which the UNI interface or the ENNI interface is located, an identifier of a physical interface, an identifier of a network domain to which the UNI interface or the ENNI interface belongs, and the like.

It should be noted that a link between a UNI and an ENNI may be considered as a logical link, and the logical link may include multiple direct physical links between physical devices. A sum of all direct link costs on a logical link from a UNI to an ENNI, a logical link from an ENNI to a UNI, or a logical link from an ENNI to an ENNI may be used as costs of the logical link, and minimum bandwidth of all direct links on the logical link is used as bandwidth of the logical link. Certainly, information such as the link costs and the bandwidth of the logical link may be set in many other manners, and only one preferred manner is listed herein.

For example, as shown in FIG. 6, for the network domain 1 in the multi-domain network shown in FIG. 5, connection relationships between devices may be abstracted as information about links between the UNI1, the ENNI1, the ENNI2, and the ENNI3. A connection relationship between a device in the network domain and a device in the network domain 2 is abstracted as information about a link between the ENNI1 in the network domain 1 and the ENNI1 in the network domain 2, connection relationships between devices in the network domain and devices in the network domain 2 are abstracted as information about a link between the ENNI2 in the network domain 1 and the ENNI1 in the network domain 3 and information about a link between the ENNI3 in the network domain 1 and the ENNI2 in the network domain 3. For the network domain 2 and the network domain 3, abstraction may be performed in a similar manner, and details are not described herein repeatedly.

304. The orchestration device combines the link information of each network domain and the information about a terminal that accesses each UNI into the domain resource information.

After abstracting the link information of each network domain in the multi-domain network and the information about a terminal that accesses each UNI, the orchestration apparatus combines the link information of each network domain and the information about a terminal that accesses each UNI into the domain resource information.

It may be understood that in each network domain, there are many devices, and many interfaces accordingly. For the domain resource information, only an interface used for user access is abstracted as a UNI, an interface connected to another network domain is abstracted as an ENNI, and only information about links between UNIs and ENNIs is stored. The link information herein represents information about a logical link between a UNI interface and an ENNI interface, and the logical link may include one or more direct physical links. The information about a logical link between a UNI interface and an ENNI interface may include information about a link from a UNI to an ENNI, information about a link from an ENNI to a UNI, information about a link from an ENNI to another ENNI in a same network domain, and information about a link from an ENNI to an ENNI in an adjacent domain, and may further include information about a link from a UNI to a UNI.

It should be noted that the abstracted domain resource information may be represented and stored using a topology diagram, or may be represented and stored using a table or a database. This is not limited herein. The following describes in detail a case in which the domain resource information is stored using a table.

305. The orchestration device receives an NaaS service request, where the NaaS service request is used to request to establish an NaaS service between a first terminal and a second terminal.

In the multi-domain network that includes multiple network domains, the orchestration device may receive an end-to-end NaaS service request sent by an NaaS user or an upper-layer application, and the NaaS service request is used to request to establish the NaaS service between the first terminal and the second terminal.

It may be understood that both the first terminal and the second terminal may be an independent terminal, or may be a terminal group that includes multiple terminals. This is not limited herein.

The NaaS service request may include information about the first terminal and information about the second terminal, and may further include information about a UNI accessed by the first terminal and information about a UNI accessed by the second terminal. This is not limited herein.

For example, in the multi-domain network shown in FIG. 4, the NaaS service request may be requesting to establish an NaaS service from the terminal A to the terminal B, and the NaaS service request may include information about the terminal A is a user identifier user1 and location information Beijing, and information about the terminal B is a user identifier user2 and location information Shanghai.

306. The orchestration device obtains information about a first UNI and information about a second UNI in the multi-domain network according to the NaaS service request, where the first UNI is used by the first terminal to access a first network domain, the second UNI is used by the second terminal to access a second network domain, and the multi-domain network includes at least two network domains.

After receiving the NaaS service request, the orchestration device obtains the information about the first user-to-network interface UNI and the information about the second UNI in the multi-domain network according to the NaaS service request, where the first UNI is used by the first terminal to access the first network domain, the second UNI is used by the second terminal to access the second network domain, and the multi-domain network includes at least two network domains.

The NaaS service request may directly include the information about the first UNI accessed by the first terminal and the information about the second UNI accessed by the second terminal. If the NaaS service request does not include the information about the first UNI or the information about the second UNI, the orchestration device may query the domain resource information according to the information about the first terminal and the information about the second terminal, to find the information about the first UNI and the information about the second UNI.

For example, in the multi-domain network shown in FIG. 5, after obtaining the information about the terminal A and the information about the terminal B, the orchestration device may query information about a UNI in each network domain in the domain resource information, to obtain information about the UNI1 (the first UNI) that is in the network domain 1 and that is accessed by the terminal A and information about a UNI1 (the second UNI) that is in the network domain 3 and that is accessed by the terminal B.

307. The orchestration device queries the domain resource information according to the information about the first UNI and the information about the second UNI, to determine that the first UNI and the second UNI do not belong to a same network domain.

After obtaining the information about the first UNI and the information about the second UNI, the orchestration device may query the domain resource information to determine whether the first terminal and the second terminal access a same network domain.

In this embodiment, the first UNI accesses the first network domain, and the second UNI accesses the second network domain, and therefore, it may be determined that the first UNI and the second UNI do not access a same network domain.

In actual application, the first UNI and the second UNI may access a same network domain. After obtaining the information about the first UNI and the information about the second UNI, the orchestration device may first query the domain resource information to determine whether the first UNI and the second UNI belong to a same network domain. If the first UNI and the second UNI belong to a same network domain, the orchestration device may perform step 307 and subsequent steps in this embodiment, or if the first UNI and the second UNI do not belong to a same network domain, the orchestration device may directly send the NaaS service request to a control device in the network domain.

For example, in the multi-domain network shown in FIG. 5, the orchestration device queries the domain resource information to learn that the terminal A accesses the network domain 1 using the UNI1, and the terminal B accesses the network domain 3 using the UNI1, and in this case, it is determined that the first terminal and the second terminal do not access a same network domain.

308. The orchestration device queries the domain resource information according to the information about the first UNI and the information about the second UNI, to obtain a cross-domain path between the first UNI and the second UNI.

The orchestration device queries the domain resource information according to the information about the first UNI and the information about the second UNI, to obtain the cross-domain path between the first UNI and the second UNI.

It may be understood that the domain resource information includes the link information of each network domain, that is, includes a connection relationship between a UNI and an ENNI, a connection relationship between ENNIs in each network domain, and a connection relationship between an ENNI in each network and an ENNI in an adjacent domain. Therefore, after obtaining the information about the first UNI and the information about the second UNI, the cross-domain path between the first UNI and the second UNI may be obtained by querying the domain resource information.

The orchestration device may obtain the cross-domain path between the first UNI and the second UNI by means of computation according to the information about the first UNI, the information about the second UNI, the domain resource information, and a preset path computation policy.

It may be understood that there may be multiple types of preset path computation policies, and the preset path computation policies may be selected according to different actual requirements. For example, the preset path computation policy may be minimizing a quantity of network domains that the cross-domain path passes through, or may be minimizing inter-domain costs when the cross-domain path crosses domains, or may be ensuring rated inter-domain bandwidth when the cross-domain path traverses domains, and there may be another preset path computation policy. This is not limited herein.

For example, in the multi-domain network shown in FIG. 5, a cross-domain path that is obtained by means of computation and that is from the terminal A to the terminal B may be the UNI1 in the network domain 1→the ENNI2 in the network domain 1→the ENNI1 in the network domain 3→the UNI1 that is in the network domain 3 and that is accessed by the terminal B, or the UNI1 in the network domain 1→the ENNI1 in the network domain 1→the ENNI1 in the network domain 2→the ENNI2 in the network domain 2→the ENNI2 in the network domain 3→the UNI1 that is in the network domain 3 and that is accessed by the terminal B. According to different computation policies, one of the paths may be selected.

309. The orchestration device determines network domains that the cross-domain path passes through, and obtains a first connection requirement and a second connection requirement of each network domain of the network domains that the cross-domain path passes through, where the first connection requirement is an intra-domain connection requirement of each network domain, and the second connection requirement is an inter-domain connection requirement between each network domain and an adjacent domain.

After the cross-domain path is obtained by means of computation, the network domains that the cross-domain path passes through are determined, and the first connection requirement and the second connection requirement of each network domain of the network domains that the cross-domain path passes through are obtained, where the first connection requirement is an intra-domain connection requirement of each network domain, and the second connection requirement is an inter-domain connection requirement between each network domain and an adjacent domain.

For example, in the multi-domain network shown in FIG. 5, the cross-domain path from the terminal A to the terminal B: the UNI1 in the network domain 1→the ENNI1 in the network domain 1→the ENNI1 in the network domain 2→the ENNI2 in the network domain 2→the ENNI2 in the network domain 3→the UNI1 that is in the network domain 3 and that is accessed by the terminal B is divided into: in the network domain 1: a first connection requirement from the UNI1 to the ENNI1 in the network domain 1, and a second connection requirement from the ENNI1 in the network domain 1 to the ENNI1 in the network domain 2; in the network domain 2: a first connection requirement from the ENNI1 in the network domain 2 to the ENNI2 in the network domain 2, and a second connection requirement from the ENNI2 in the network domain 2 to the ENNI2 in the network domain 3; in the network domain 3: a first connection requirement from the ENNI2 in the network domain 3 to the UNI1 in the network domain 3.

It may be understood that, in addition to a link connection relationship, the first connection requirement and the second connection requirement may include a requirement for link parameter, for example, a bandwidth, costs, and the like.

310. The orchestration device parses a UNI or an ENNI in the first connection requirement and the second connection requirement of each network domain as a corresponding physical interface in the network domain.

After obtaining the first connection requirement and the second connection requirement of each network domain, the orchestration device parses the UNI or the ENNI in the first connection requirement and the second connection requirement of each network domain as the corresponding physical interface in the network domain.

It may be understood that because the domain resource information is abstracted by the orchestration device, that is, the orchestration device abstracts a physical interface as a UNI or an ENNI, the orchestration apparatus may successfully parse the UNI or the ENNI in the first connection requirement and the second connection requirement as the corresponding physical interface in each network domain, and does not need to further obtain additional information from another network element.

For example, the orchestration device parses the first connection requirement from the UNI1 to the ENNI1 in the network domain 1 as a first connection requirement from an interface 1 of the device 1 in the network domain 1 to an interface 3 of the device 2 in the network domain 1, and parses the second connection requirement from the ENNI1 in the network domain 1 to the ENNI1 in the network domain 2 as a second connection requirement from the interface 3 of the device 2 in the network domain 1 to an interface 1 of the device 1 in the network domain 2. Another first connection requirement or another second connection requirement may be parsed in a similar manner, and details are not described herein repeatedly.

311. The orchestration device sends the first connection requirement and the second connection requirement of each network domain that are obtained after the parsing to a control device in the network domain, so that the control device in each network domain establishes an NaaS service from the first terminal to the second terminal according to the first connection requirement and the second connection requirement that are obtained after the parsing.

For example, in the multi-domain network shown in FIG. 5, after the cross-domain path from the terminal A to the terminal B is divided among the network domain 1, the network domain 2, and the network domain 3, the orchestration device sends the first connection requirement (from the interface 1 of the device 1 in the network domain 1 to the interface 3 of the device 2 in the network domain 1) and the second connection requirement (from the interface 3 of the device 2 in the network domain 1 to the interface 1 of the device 1 in the network domain 2) of the network domain 1 to a control device in the network domain 1, and accordingly sends a first connection requirement and a second connection requirement that are of the network domain 2 and obtained after parsing to a control device in the network domain 1 and a first connection requirement and a second connection requirement that are of the network domain 3 and obtained after parsing to a control device in the network domain 2.

In this embodiment of the application, an orchestration apparatus abstracts domain resource information, and the orchestration apparatus completes parsing of a first connection requirement and a second connection requirement, thereby reducing unnecessary information exchange, and improving service connection establishment efficiency.

2. Domain resource information is directly obtained by an orchestration apparatus.

Figure 7B:
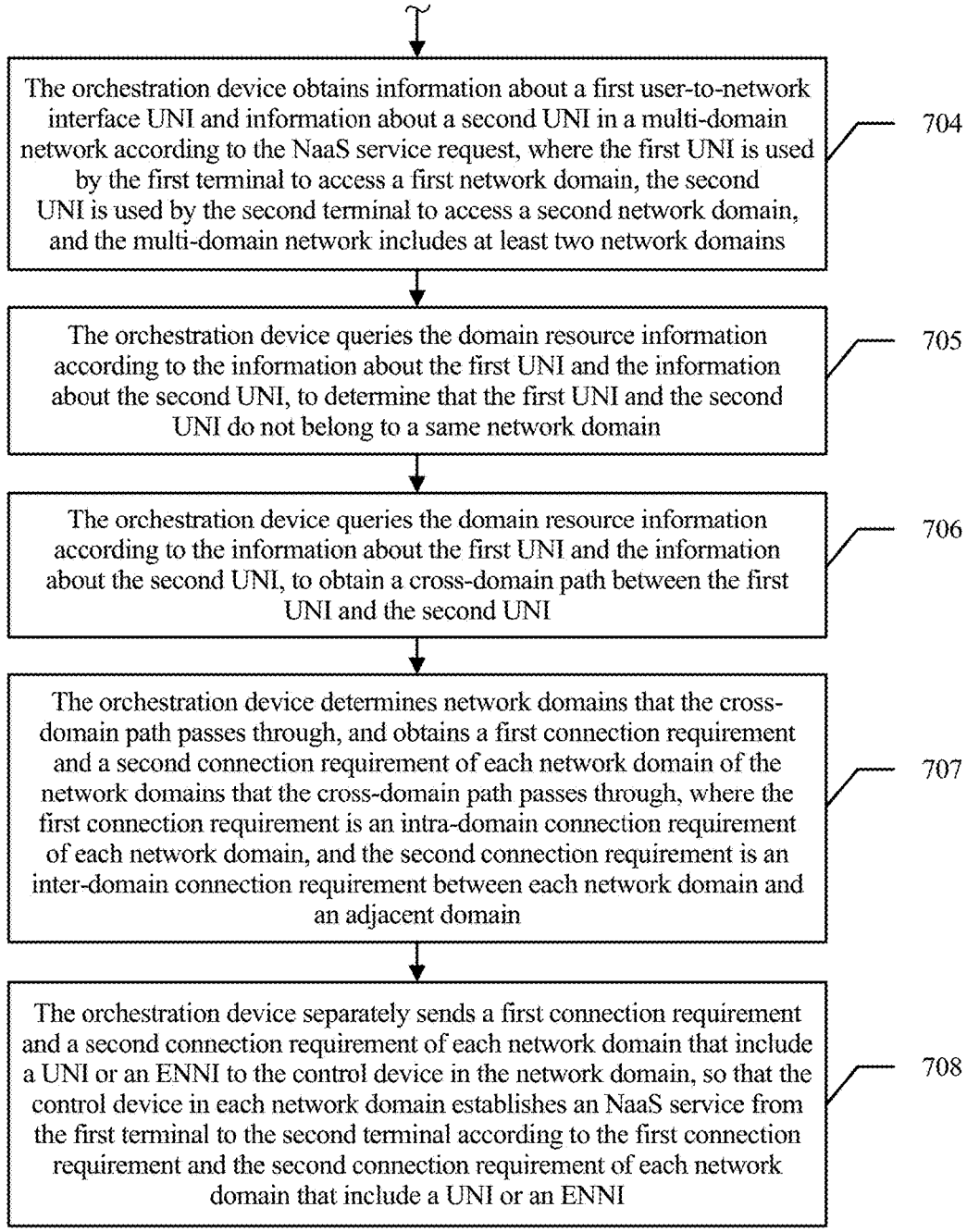

Referring to FIG. 7A and FIG. 7B, another embodiment of an NaaS service cross-domain orchestration method in an embodiment of the application includes the following steps.

701. An orchestration device receives information about a link between a UNI and an ENNI in each network domain, information about a link between ENNIs in each network domain, information about a link from an ENNI in each network domain to an ENNI in an adjacent domain, and information about a terminal that accesses a UNI in each network domain that are sent by a control device in each network domain.

In this embodiment, physical devices are not abstracted as UNIs or ENNIs by the orchestration apparatus, but are abstracted by the control device in each network domain in a multi-domain network, and then the control device directly sends information about links between the abstracted UNIs and the abstracted ENNIs to the orchestration device. The orchestration device receives the information about a link between a UNI and an ENNI in each network domain, the information about a link between ENNIs in each network domain, the information about a link from an ENNI in each network domain to an ENNI in an adjacent domain, and the information about a terminal that accesses a UNI in each network domain that are sent by the control device in each network domain.

702. The orchestration device combines the information about a link between a UNI and an ENNI in each network domain, the information about a link between ENNIs in each network domain, the information about a link from an ENNI in each network domain to an ENNI in an adjacent domain, and the information about a terminal that accesses a UNI in each network domain into the domain resource information.

After receiving the information about a link between a UNI and an ENNI in each network domain, the information about a link between ENNIs in each network domain, the information about a link from an ENNI in each network domain to an ENNI in an adjacent domain, and the information about a terminal that accesses a UNI in each network domain that are sent by each network domain in the multi-domain network, the orchestration apparatus combines the information about a link between a UNI and an ENNI in each network domain, the information about a link between ENNIs in each network domain, the information about a link from an ENNI in each network domain to an ENNI in an adjacent domain, and the information about a terminal that accesses a UNI in each network domain into the domain resource information in the entire multi-domain network.

It may be understood that information abstracted by the control device in each network domain is obtained and then is combined into the domain resource information in the entire multi-domain network in step 701 and step 702. Optionally, the orchestration apparatus may directly obtain the domain resource information in the multi-domain network using a network management system.

703. The orchestration device receives an NaaS service request, where the NaaS service request is used to request to establish an NaaS service between a first terminal and a second terminal.

704. The orchestration device obtains information about a first user-to-network interface UNI and information about a second UNI in a multi-domain network according to the NaaS service request, where the first UNI is used by the first terminal to access a first network domain, the second UNI is used by the second terminal to access a second network domain, and the multi-domain network includes at least two network domains.

705. The orchestration device queries the domain resource information according to the information about the first UNI and the information about the second UNI, to determine that the first UNI and the second UNI do not belong to a same network domain.

706. The orchestration device queries the domain resource information according to the information about the first UNI and the information about the second UNI, to obtain a cross-domain path between the first UNI and the second UNI.

707. The orchestration device determines network domains that the cross-domain path passes through, and obtains a first connection requirement and a second connection requirement of each network domain of the network domains that the cross-domain path passes through, where the first connection requirement is an intra-domain connection requirement of each network domain, and the second connection requirement is an inter-domain connection requirement between each network domain and an adjacent domain.

Steps 703 to 707 are similar to steps 305 to 309, and details are not described herein repeatedly.

708. The orchestration device separately sends a first connection requirement and a second connection requirement of each network domain that include a UNI or an ENNI to the control device in the network domain, so that the control device in each network domain establishes an NaaS service from the first terminal to the second terminal according to the first connection requirement and the second connection requirement of the network domain that include a UNI or an ENNI.

In this embodiment, a UNI or an ENNI in the domain resource information is not abstracted by the orchestration device, but is abstracted by the control device. Therefore, after obtaining the first connection requirement and the second connection requirement that include a UNI or an ENNI, the orchestration device may directly send the first connection requirement and the second connection requirement to the control device in each network domain without parsing the first connection requirement and the second connection requirement, and the control device completes the parsing. Because the abstraction is completed by the control device, the control device includes information required in the parsing.

For example, in a multi-domain network shown in FIG. 5, after a cross-domain path from a terminal A to a terminal B is divided among a network domain 1, a network domain 2, and a network domain 3, the orchestration device sends a first connection requirement (from a UNI1 in the network domain 1 to an ENNI1 in the network domain 1) and a second connection requirement (from the ENNI1 in the network domain 1 to an ENNI1 in the network domain 2) of the network domain 1 to a control device in the network domain 1, and accordingly sends a first connection requirement and a second connection requirement that are of the network domain 2 and obtained after parsing to a control device in the network domain 1 and a first connection requirement and a second connection requirement that are of the network domain 3 and obtained after parsing to a control device in the network domain 2.

In this embodiment, an orchestration apparatus directly obtains domain resource information, and directly sends a first connection requirement and a second connection requirement of each network domain that include a UNI or an ENNI to a control device in a corresponding network domain, and the orchestration device does not need to complete a parsing process, thereby reducing system costs of the orchestration apparatus, and improving running efficiency of the orchestration apparatus.

The following describes in detail an example in which the abstracted domain resource information in the application is represented and stored using a table.

(1). Domain resource information of each network domain may mainly include information about a control device in a domain, access information of a terminal, and information about a connection between a domain and an adjacent domain.

The information about a control device in a domain may uniquely identify the control device in the domain using a universally unique identifier (UUID).

The access information of a terminal may represent an interface accessed by the terminal as a UNI, and may further include a device ID and a port ID of the device corresponding to the interface.

The intra-domain connection information and the information about a connection between a domain and an adjacent domain include information about a link between a UNI and an ENNI in this domain, information about a link between ENNIs in this domain, and information about a link between an ENNI in this domain and an ENNI in an adjacent domain.

The abstracted domain resource information may be stored and maintained using a domain resource information abstraction table, and a format of the table may be shown in the following Table 1.

TABLE 1

| Network domain identifier | Control device identifier | User-network interface (UNI) | External network-to-network interface (ENNI) |
|---|---|---|---|
| Network domain 1 | UUID1 | UNI list 1 | ENNI list 1 |
| Network domain 2 | UUID2 | UNI list 2 | ENNI list 2 |
| Network domain 3 | UUID2 | UNI list 3 | ENNI list 3 |

Both the network domain identifier and the control device identifier are an UUID. Network domain identifiers of network domains are different, and the network domain identifier is used to uniquely identify each network domain in the multi-domain network. Control device identifiers of the network domains are also different, and the control device identifier is used to uniquely identify a control device in a network domain. In actual application, a network domain identifier and a control device identifier of a same network domain may be a same UUID, or may be different UUIDs. This is not limited herein.

An UNI list includes information about a terminal that accesses each UNI in a network domain and information about a link from a UNI in a network domain and an ENNI in the network domain, which may be stored using the following Table 2.

TABLE 2

| | | | | Information about a link with an ENNI | | |
|---|---|---|---|---|---|---|
| UNI identifier | Network device identifier | Interface identifier | User information | Network device identifier | Interface identifier | Link information |
| UNI1 | NE1 | Interface 1 | User information list | NE3 | Interface 2 | Costs, bandwidth, and the like |
| UNI2 | NE2 | Interface 2 | User information list | NE4 | Interface 1 | Costs, bandwidth, and the like |
| UNI3 | NE3 | Interface 1 | User information list | NE5 | Interface 3 | Costs, bandwidth, and the like |

It may be understood that the foregoing ENNI connected to a UNI is definitely an ENNI in this network domain.

An ENNI list includes information about a link from an ENNI in a network domain to a UNI or an ENNI in the network domain, and information about a link from an ENNI in a network domain to an ENNI in another network domain, which may be stored using the following Table 3.

TABLE 3

| | | | | Link information | | | |
|---|---|---|---|---|---|---|---|
| | | | | UNI/ENNI | | | |
| ENNI identifier | Network device identifier | Interface identifier | Network domain identifier | Type | Network device identifier | Interface identifier | Link information |
| ENNI1 | NE1 | Interface 1 | Network domain 1 | UNI | NE1 | Interface 2 | Costs, bandwidth, and the like |
| ENNI2 | NE1 | Interface 2 | Network domain 1 | ENNI | NE2 | Interface 1 | Costs, bandwidth, and the like |
| ENNI3 | NE2 | Interface 1 | Network domain 3 | ENNI | NE1 | Interface 3 | Costs, bandwidth, and the like |

If the foregoing table is a list of an ENNI in a network domain 1, a connection peer end of the ENNI in the network domain 1 may be a UNI in this network domain, may be an ENNI in this network domain, or may be an ENNI in an adjacent domain.

It may be understood that in addition to the foregoing domain resource information table, the domain resource information may be stored in another manner. This is not limited herein.

(2). In addition, an abstracted connection relationship between a UNI or an ENNI and an ENNI in a network domain may be independently represented and stored using an inter-domain topology resource information table.

A connection between a domain and an adjacent domain is described using an ENNI pair, and if there are multiple connections between a domain and an adjacent domain, multiple ENNI pairs are used for description.

The ENNI pair may be represented by two directional ENNIs, and a direction indicates an inter-domain connection from a domain X to a domain Y.

The abstracted connection relationship between a UNI or an ENNI and an ENNI in a network domain may be stored and maintained using an inter-domain topology resource information table, and a format of the table may be shown in the following Table 4.

TABLE 4

| | Identifier of network domain Y | | |
|---|---|---|---|
| Identifier network domain X | Network domain 1 | Network domain 2 | Network domain 3 |
| Network domain 1 | UNI/ENNI-ENNI list | ENNI-pair list | ENNI-pair list |
| Network domain 2 | ENNI-pair list | UNI/ENNI-ENNI list | ENNI-pair list |
| Network domain 3 | ENNI-pair list | ENNI-pair list | UNI/ENNI-ENNI list |

It may be understood that in this network domain, for example, from the network domain 1 to the network domain 1, according to whether a terminal accesses the network domain 1, there may be a link from a UNI to an ENNI and a link from an ENNI to an ENNI, or there may be only a link from an ENNI to an ENNI, and in this case, a link list of the network domain 1 is a UNI/ENNI-ENNI list. Certainly, there is only a link from an ENNI to an ENNI between different network domains, and in this case, a link list is an ENNI-pair list.

Link information represented by the ENNI-pair list may be stored using the following Table 5.

TABLE 5

| ENNI-pair list identifier | ENNI-pair information | Link information |
|---|---|---|
| ENNI-pair 1 | ENNI-ENNI | Costs, bandwidth, and the like |
| ENNI-pair 2 | ENNI-ENNI | Costs, bandwidth, and the like |
| ENNI-pair 3 | ENNI-ENNI | Costs, bandwidth, and the like |

Link information represented by the UNI/ENNI-ENNI list may be stored using the following Table 6.

TABLE 6

| UNI/ENNI-ENNI identifier | UNI/ENNI-ENNI information | Link information |
|---|---|---|
| UNI/ENNI-ENNI1 | UNI-ENNI | Costs, bandwidth, and the like |
| UNI/ENNI-ENNI2 | UNI-ENNI | Costs, bandwidth, and the like |
| UNI/ENNI-ENNI3 | ENNI-ENNI | Costs, bandwidth, and the like |

It may be understood that in addition to the foregoing domain resource information table or the inter-domain topology resource information table, the inter-domain resource information may be represented and stored in another manner. This is not limited herein.

The foregoing describes the NaaS service cross-domain orchestration method in this embodiment of the application using an orchestration device as an execution body, and the following describes the NaaS service cross-domain orchestration method in this embodiment of the application using a control device as an execution body.

2. A control device in a network domain is used as an execution body.

Figure 8:
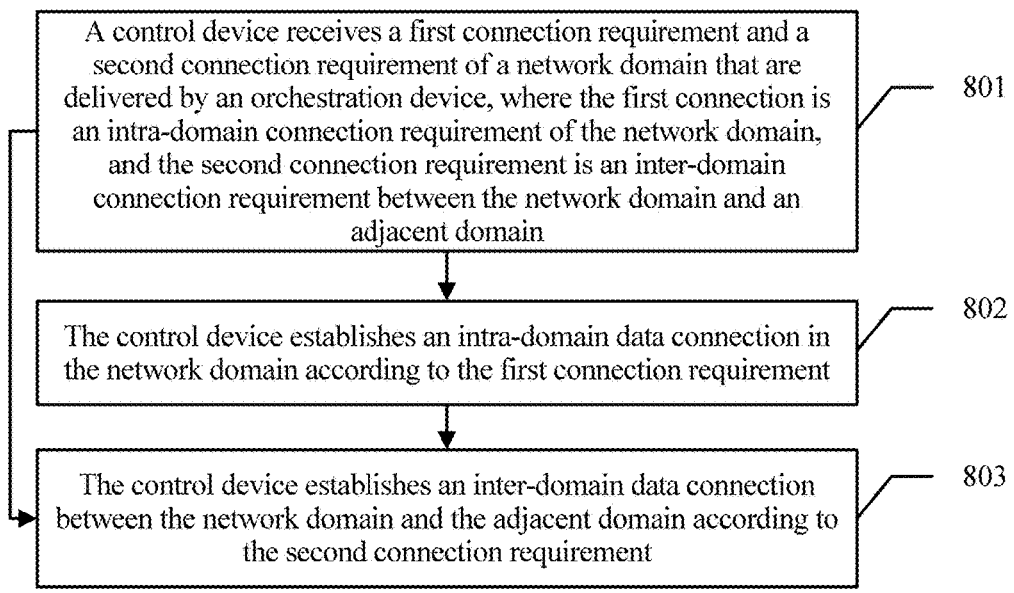
FIG. 8 is another schematic flowchart of an NaaS service cross-domain orchestration method according to an embodiment of the application.

Referring to FIG. 8, another embodiment of an NaaS service cross-domain orchestration method in an embodiment of the application includes the following steps.

801. A control device receives a first connection requirement and a second connection requirement of a network domain that are delivered by an orchestration device, where the first connection is an intra-domain connection requirement of the network domain, and the second connection requirement is an inter-domain connection requirement between the network domain and an adjacent domain.

When the orchestration device in a multi-domain network sends a first connection requirement and a second connection requirement of each network domain on an end-to-end cross-domain path to a control device in the network domain, the control device in the network domain receives the first connection requirement and the second connection requirement of the network domain that are delivered by the orchestration device, where the first connection is an intra-domain connection requirement of the network domain, and the second connection requirement is an inter-domain connection requirement between the network domain and the adjacent domain.

802. The control device establishes an intra-domain data connection in the network domain according to the first connection requirement.

The control device establishes the intra-domain data connection in the network domain according to the received first connection requirement.

803. The control device establishes an inter-domain data connection between the network domain and the adjacent domain according to the second connection requirement.

The control device establishes the inter-domain data connection between the network domain and the adjacent domain according to the received second connection requirement.

In this embodiment of the application, after receiving the first connection requirement and the second connection requirement of the network domain that are delivered by the orchestration device, the control device establishes the data connection in the network domain according to the first connection requirement, and establishes the data connection to the adjacent domain according to the inter-domain second connection requirement between the network domain and the adjacent domain. Each control device, in each network domain in the multi-domain network, that receives a first connection requirement and a second connection requirement performs same processing, that is, completes an end-to-end cross-domain NaaS service connection in the entire multi-domain network by means of orchestration.

In actual application, a physical interface in a network domain is abstracted as a UNI or an ENNI. That may be completed by the orchestration apparatus, or may be completed by the control device. If the abstraction process is completed by the control device, when delivering a first connection requirement and a second connection requirement, the orchestration device may directly deliver a connection requirement that includes a UNI or an ENNI without parsing the connection requirement. If the abstraction process is completed by the orchestration device, before delivering a connection requirement, the orchestration device may first parse a UNI or an ENNI in the connection requirement as a physical interface in a corresponding network domain. The following describes the NaaS service cross-domain orchestration method in this embodiment of the application by separately describing the two cases.

1. A control device completes an abstraction process by itself, and sends abstracted information to an orchestration apparatus.

Figure 9A:
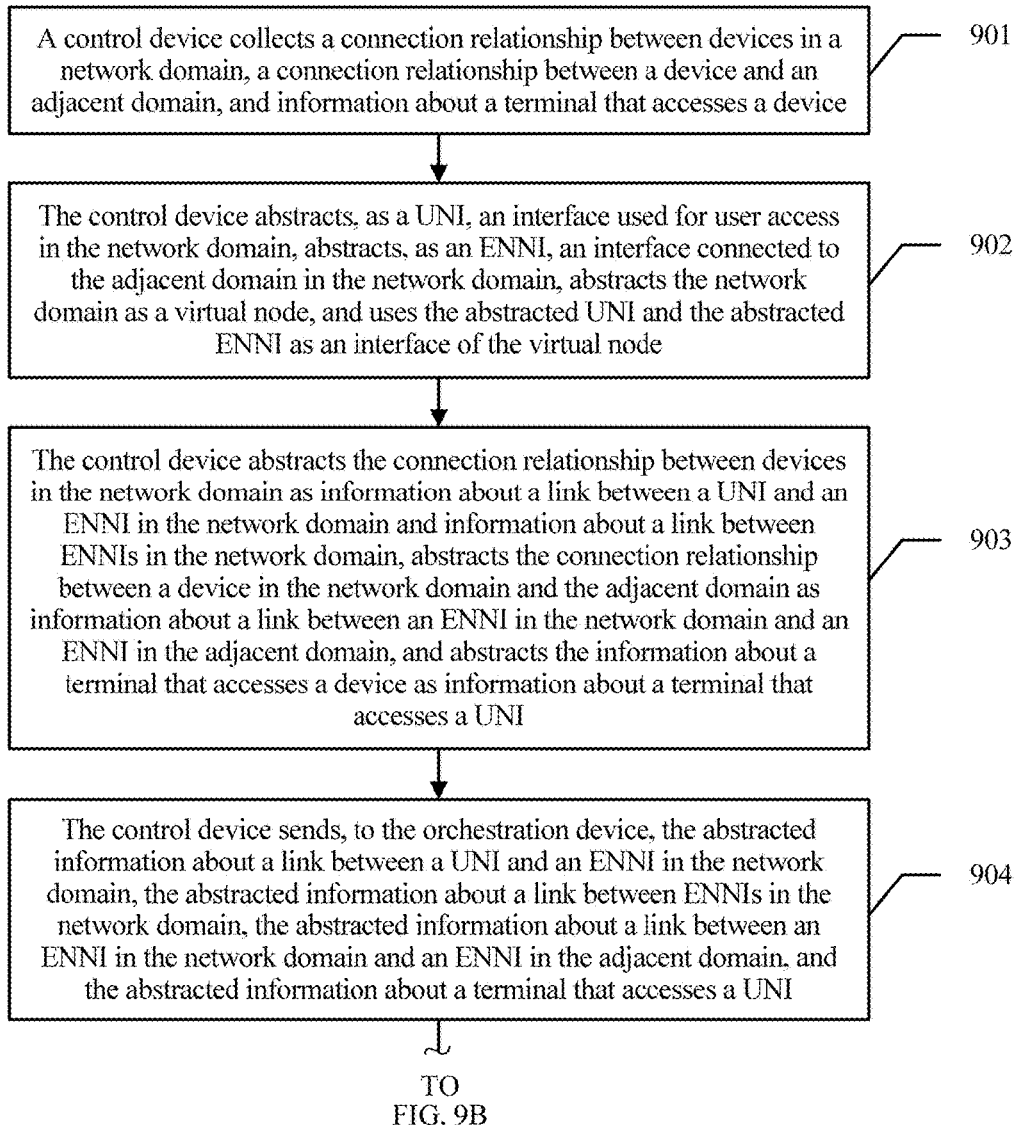
FIG. 9A and FIG. 9B are another schematic flowchart of an NaaS service cross-domain orchestration method according to an embodiment of the application.
Figure 9B:
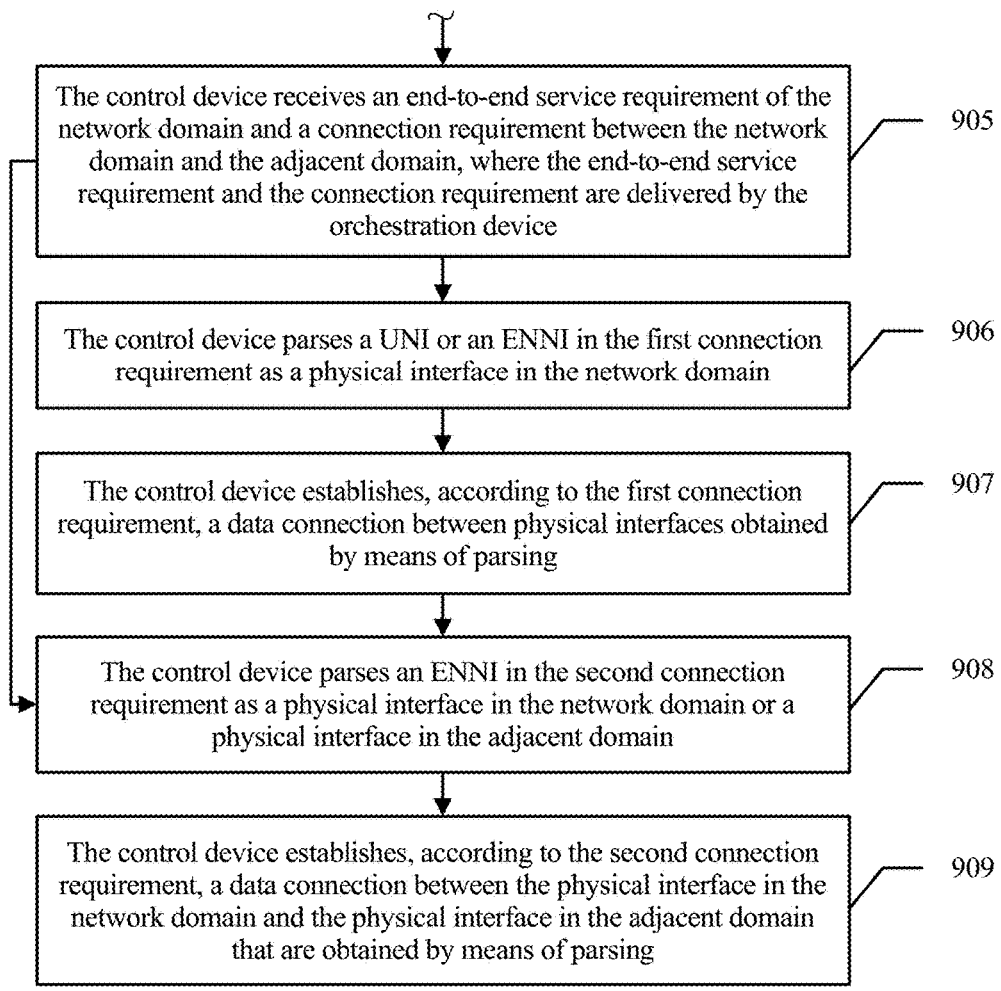

Referring to FIG. 9A and FIG. 9B, another embodiment of an NaaS service cross-domain orchestration method in an embodiment of the application includes the following steps.

901. A control device collects a connection relationship between devices in a network domain, a connection relationship between a device and an adjacent domain, and information about a terminal that accesses a device.

The control device in the network domain collects the connection relationship between devices in the network domain, the connection relationship between a device and the adjacent domain, and the information about a terminal that accesses a device in the network domain.

902. The control device abstracts, as a UNI, an interface used for user access in the network domain, abstracts, as an ENNI, an interface connected to the adjacent domain in the network domain, abstracts the network domain as a virtual node, and uses the abstracted UNI and the abstracted ENNI as an interface of the virtual node.

After collecting the connection relationship between devices in the network domain, the connection relationship between a device and the adjacent domain, and the information about a terminal that accesses a device in the network domain, the control device abstracts, as a UNI, the interface used for user access, abstracts, as an ENNI, the interface connected to the adjacent domain in the network domain, abstracts the network domain as a virtual node, and uses the abstracted UNI and the abstracted ENNNI as an interface of the virtual node.

903. The control device abstracts the connection relationship between devices in the network domain as information about a link between a UNI and an ENNI in the network domain and information about a link between ENNIs in the network domain, abstracts the connection relationship between a device in the network domain and the adjacent domain as information about a link between an ENNI in the network domain and an ENNI in the adjacent domain, and abstracts the information about a terminal that accesses a device as information about a terminal that accesses a UNI.

After abstracting a UNI and an ENNI in each network domain, the control devices abstracts the connection relationship between devices in the network domain as the information about a link between a UNI and an ENNI in the network domain and the information about a link between ENNIs in the network domain, abstracts the connection relationship between a device in the network domain and the adjacent domain as the information about a link between an ENNI in the network domain and an ENNI in the adjacent domain, and abstracts the information about a terminal that accesses a device in the network domain as the information about a terminal that accesses a UNI.

It should be noted that when the connection relationship between devices is abstracted as the information about a link between a UNI and an ENNI and the information about a link between ENNIs, in addition to a link direction and information about UNI interfaces or ENNI interfaces at two ends of a link, the link information includes information such as link costs (cost) and bandwidth. The UNI interface information or the ENNI interface information includes an identifier of a physical device in which the UNI interface or the ENNI interface is located, an identifier of a physical interface, an identifier of a network domain to which the UNI interface or the ENNI interface belongs, and the like.

It should be noted that a link between a UNI and an ENNI or a link between ENNIs may be considered as a logical link, and the logical link may include multiple direct links between physical devices. A sum of all direct link costs on a logical link from a UNI to an ENNI, a logical link from an ENNI to a UNI, or a logical link from an ENNI to an ENNI may be used as costs of the logical link, and minimum bandwidth of all direct links on the logical link is used as bandwidth of the logical link. Certainly, information such as the link costs and the bandwidth of the logical link may be set in many other manners, and only one preferred manner is listed herein.

904. The control device sends, to the orchestration device, the abstracted information about a link between a UNI and an ENNI in the network domain, the abstracted information about a link between ENNIs in the network domain, the abstracted information about a link between an ENNI in the network domain and an ENNI in the adjacent domain, and the abstracted information about a terminal that accesses a UNI.

After abstracting the information about a link between a UNI and an ENNI in the network domain, the information about a link between ENNIs in the network domain, the information about a link between an ENNI in the network domain and an ENNI in the adjacent domain, and the information about a terminal that accesses a UNI in the network domain, the control device sends all the information to the orchestration device, so that the orchestration device combines all the information in each network domain into domain resource information in a multi-domain network.

905. The control device receives an end-to-end service requirement of the network domain and a connection requirement between the network domain and the adjacent domain, where the end-to-end service requirement and the connection requirement are delivered by the orchestration device.

When the orchestration device in the multi-domain network sends a first connection requirement and a second connection requirement of each network domain on an end-to-end cross-domain path to a control device in a corresponding network domain, the control device in the network domain receives the first connection requirement and the second connection requirement delivered by the orchestration device.

906. The control device parses a UNI or an ENNI in the first connection requirement as a physical interface in the network domain.

After receiving the first connection requirement sent by the orchestration device, the control device parses the UNI or the ENNI in the first connection requirement as the physical interface in the network domain.

It may be understood that because the UNI or the ENNI in the network domain is abstracted by the control device, the control device stores information required for parsing the UNI or the ENNI, and can complete a parsing process without a need to receive additional information sent by another network element.

907. The control device establishes, according to the first connection requirement, a data connection between physical interfaces obtained by means of parsing.

After parsing the UNI or the ENNI in the first connection requirement as the physical interface in the network domain, the control device establishes, according to the first connection requirement, the data connection between the physical interfaces obtained by means of parsing.

908. The control device parses an ENNI in the second connection requirement as a physical interface in the network domain or a physical interface in the adjacent domain.

Similar to parsing of the first connection requirement, after receiving an inter-domain second connection requirement that is between the network domain and the adjacent domain and that is sent by the orchestration device, the control device parses an ENNI in the second connection requirement as a physical interface in the network domain or a physical interface in the adjacent domain.

909. The control device establishes, according to the second connection requirement, a data connection between the physical interface in the network domain and the physical interface in the adjacent domain that are obtained by means of parsing.

After parsing the ENNI in the second connection requirement as the physical interface in the network domain or the physical interface in the adjacent domain, the control device establishes, according to the second connection requirement, the data connection between the physical interface in the network domain and the physical interface in the adjacent domain that are obtained by means of parsing.

In this embodiment, a control device abstracts a physical interface, and parses a first connection requirement and a second connection requirement, thereby reducing steps that need to be performed by an orchestration device, improving efficiency of dividing a cross-domain path by the orchestration device, and improving NaaS service establishment efficiency.

In the foregoing embodiment, the control device abstracts a connection relationship between devices in a network domain, or the orchestration apparatus may complete the process in actual application. The control device only needs to send the connection relationship between devices to the orchestration apparatus, and receive a connection requirement obtained after parsing.

2. A control device directly sends a connection relationship between physical devices to an orchestration apparatus, and the orchestration apparatus completes an abstraction process.

Figure 10:
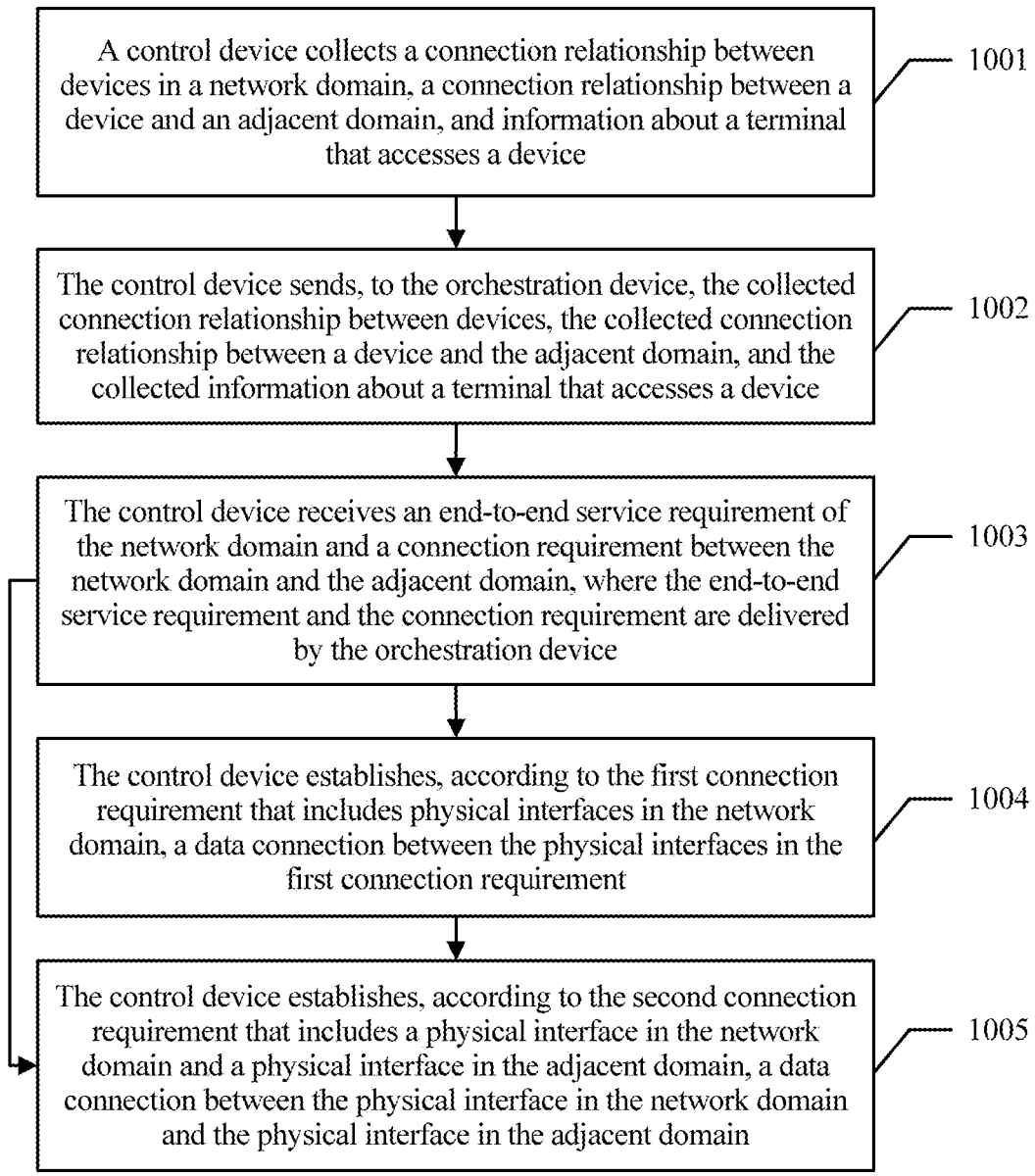
FIG. 10 is another schematic flowchart of an NaaS service cross-domain orchestration method according to an embodiment of the application.

Referring to FIG. 10, another embodiment of an NaaS service cross-domain orchestration method in an embodiment of the application includes the following steps.

1001. A control device collects a connection relationship between devices in a network domain, a connection relationship between a device and an adjacent domain, and information about a terminal that accesses a device.

Step 1001 is similar to step 901, and details are not described herein repeatedly.

1002. The control device sends, to the orchestration device, the collected connection relationship between devices, the collected connection relationship between a device and the adjacent domain, and the collected information about a terminal that accesses a device.

The control device directly sends, to the orchestration apparatus, the collected connection relationship between devices in the network domain, the collected connection relationship between a device and the adjacent domain, and the collected information about a terminal that accesses a device, and the orchestration apparatus completes an abstraction process.

1003. The control device receives an end-to-end service requirement of the network domain and a connection requirement between the network domain and the adjacent domain, where the end-to-end service requirement and the connection requirement are delivered by the orchestration device.

Because the abstraction process is completed by the orchestration apparatus, the orchestration apparatus may conveniently parse the connection requirement, and then deliver the parsed connection requirement to the control device. In this case, each connection requirement delivered to the control device includes a physical interface in the network domain.

1004. The control device establishes, according to the first connection requirement that includes physical interfaces in the network domain, a data connection between the physical interfaces in the first connection requirement.

After receiving the first connection requirement that includes physical interfaces in the network domain, the control device establishes a service connection between the physical interfaces in the first connection requirement according to the first connection requirement.

1005. The control device establishes, according to the second connection requirement that includes a physical interface in the network domain and a physical interface in the adjacent domain, a data connection between the physical interface in the network domain and the physical interface in the adjacent domain.

After receiving the second connection requirement that includes a physical interface in the network domain and a physical interface in the adjacent domain, the control device establishes the data connection between the physical interface in the network domain and the physical interface in the adjacent domain according to the second connection requirement.

In this embodiment, an orchestration device abstracts a connection relationship between devices, and parses a connection requirement, and a control device only needs to send collected information, and establish a data connection according to a delivered first connection requirement and a delivered second connection requirement that include a physical interface, thereby reducing steps that need to be performed by the control device. In actual application, this solution can be implemented without excessive transformation of an existing control device, that is, transformation costs of the control device are reduced.

Figure 11:
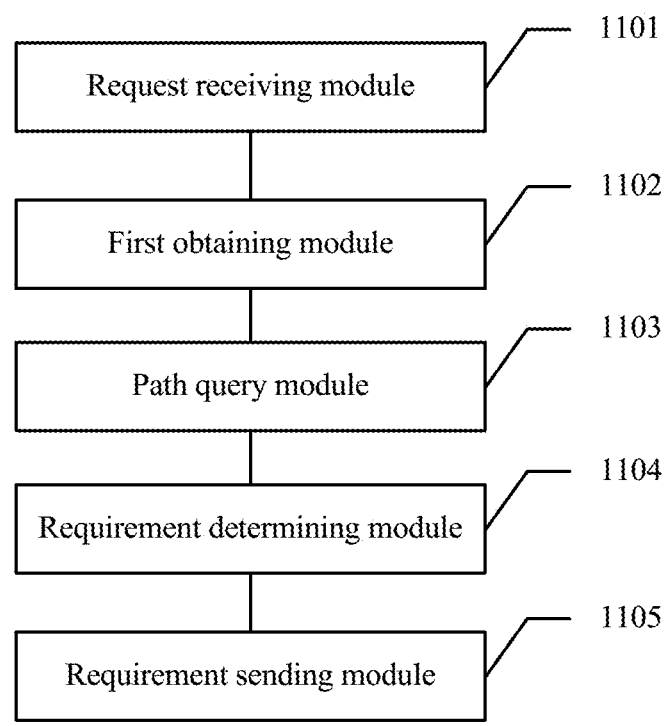
FIG. 11 is a schematic structural diagram of an orchestration device according to an embodiment of the application.

The following describes an orchestration device in an embodiment of the application. Referring to FIG. 11, an embodiment of the orchestration device in this embodiment of the application includes a request receiving module 1101 configured to receive an NaaS service request, where the NaaS service request is used to request to establish an NaaS service between a first terminal and a second terminal; a first obtaining module 1102 configured to obtain information about a first UNI and information about a second UNI in a multi-domain network according to the NaaS service request received by the request receiving module 1101, where the first UNI is used by the first terminal to access a first network domain, the second UNI is used by the second terminal to access a second network domain, and the multi-domain network includes at least two network domains; a path query module 1103 configured to query domain resource information according to the information about the first UNI and the information about the second UNI that are obtained by the first obtaining module 1102, to obtain a cross-domain path between the first UNI and the second UNI, where the domain resource information includes link information of each network domain in the multi-domain network, and the link information of each network domain includes information about a link from a UNI to an ENNI, information about a link from an ENNI to a UNI, information about a link from an ENNI to another ENNI in a same network domain, and information about a link from an ENNI to an ENNI in an adjacent domain; a requirement determining module 1104 configured to determine network domains that the cross-domain path passes through, and obtain a first connection requirement and a second connection requirement of each network domain of the network domains that the cross-domain path passes through, where the first connection requirement is an intra-domain connection requirement of each network domain, and the second connection requirement is an inter-domain connection requirement between each network domain and an adjacent domain; and a requirement sending module 1105 configured to separately send the first connection requirement and the second connection requirement that are determined by the requirement determining module 1104 and that are of each network domain to a control device in the network domain, so that the control device in each network domain establishes an NaaS service from the first terminal to the second terminal according to the first connection requirement and the second connection requirement of the network domain.

In this embodiment of the application, a first obtaining module 1102 obtains information about a first UNI and information about a second UNI in a multi-domain network according to an NaaS service request received by a request receiving module 1101, where the NaaS service request is used to request to establish an NaaS service between a first terminal and a second terminal, the first UNI is used by the first terminal to access a first network domain, and the second UNI is used by the second terminal to access a second network domain. A path query module 1103 queries domain resource information according to the information about the first UNI and the information about the second UNI, to obtain a cross-domain path between the first UNI and the second UNI. It may be understood that because the first terminal accesses the first network domain using the first UNI, and the second terminal accesses the second network domain using the second UNI, the cross-domain path is a cross-domain path between the first terminal and the second terminal. A requirement determining module 1104 determines network domains that the cross-domain path passes through, and obtains a first connection requirement and a second connection requirement of each network domain of the network domains that the cross-domain path passes through, where the first connection requirement is an intra-domain connection requirement of each network domain, and the second connection requirement is an inter-domain connection requirement between each network domain and an adjacent domain. It may be understood that when first connection requirements and second connection requirements of all network domains on the cross-domain path are met, the cross-domain path is connected. A requirement sending module 1105 sends the first connection requirement and the second connection requirement of each network domain on the cross-domain path to a control device in the network domain, so that the control device in each network domain establishes a data connection according to the received first connection requirement and the received second connection requirement of the network domain. Finally, in all the network domains on the cross-domain path, data connections are established according to the first connection requirements and the second connection requirements of all the network domains, that is, an NaaS service from the first terminal to the second terminal is established by means of combination. In this way, a cross-domain end-to-end NaaS service that crosses multiple network domains is divided into connection requirements to be performed in the network domains, so that control devices in the network domains cooperate with each other. In each network domain, only a delivered first connection requirement and a delivered second connection requirement of the network domain need to be processed, and finally, the end-to-end NaaS service in the multi-domain network that includes multiple network domains is implemented.

In the foregoing embodiment, the path query module 1103 queries the domain resource information to obtain the cross-domain path between the first UNI and the second UNI. In actual application, the path query module 1103 may obtain the cross-domain path by means of computation according to a preset path computation policy.

Optionally, in another embodiment of the orchestration device in this embodiment of the application, the path query module 1103 is configured to obtain the cross-domain path between the first UNI and the second UNI by means of computation according to the information about the first UNI, the information about the second UNI, the domain resource information, and the preset path computation policy, where the preset path computation policy includes minimizing a quantity of network domains that the cross-domain path passes through; or minimizing inter-domain costs when the cross-domain path crosses domains; or ensuring rated inter-domain bandwidth when the cross-domain path traverses domains.

In this embodiment of the application, according to an actual requirement, the path query module 1103 may compute a cross-domain path according to different preset computation policies to obtain a cross-domain path that meets the requirement.

In the foregoing embodiment, the path query module 1103 queries the domain resource information. In actual application, the domain resource information may be obtained by abstracting the multi-domain network by the orchestration device or the control device.

1. Abstraction is performed by an orchestration device.

Figure 12:
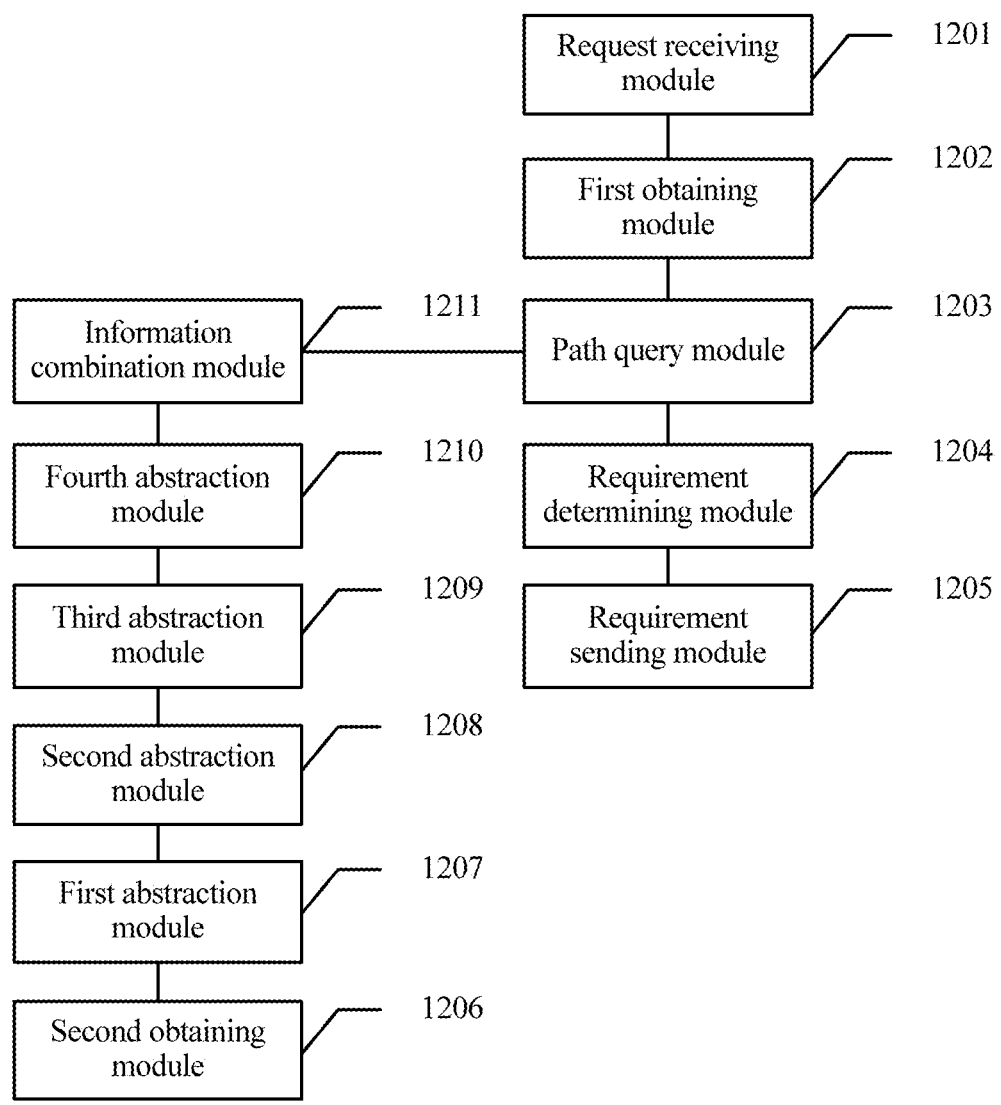
FIG. 12 is another schematic structural diagram of an orchestration device according to an embodiment of the application.

Referring to FIG. 12, another embodiment of an orchestration device in an embodiment of the application includes a request receiving module 1201 configured to receive an NaaS service request, where the NaaS service request is used to request to establish an NaaS service between a first terminal and a second terminal; a first obtaining module 1202 configured to obtain information about a first UNI and information about a second UNI in a multi-domain network according to the NaaS service request received by the request receiving module 1201, where the first UNI is used by the first terminal to access a first network domain, the second UNI is used by the second terminal to access a second network domain, and the multi-domain network includes at least two network domains; a path query module 1203 configured to query domain resource information according to the information about the first UNI and the information about the second UNI that are obtained by the first obtaining module 1202, to obtain a cross-domain path between the first UNI and the second UNI, where the domain resource information includes link information of each network domain in the multi-domain network, and the link information of each network domain includes information about a link from a UNI to an ENNI, information about a link from an ENNI to a UNI, information about a link from an ENNI to another ENNI in a same network domain, and information about a link from an ENNI to an ENNI in an adjacent domain; a requirement determining module 1204 configured to determine network domains that the cross-domain path passes through, and obtain a first connection requirement and a second connection requirement of each network domain of the network domains that the cross-domain path passes through, where the first connection requirement is an intra-domain connection requirement of each network domain, and the second connection requirement is an inter-domain connection requirement between each network domain and an adjacent domain; and a requirement sending module 1205 configured to separately send the first connection requirement and the second connection requirement that are determined by the requirement determining module 1204 and that are of each network domain to a control device in the network domain, so that the control device in each network domain establishes an NaaS service from the first terminal to the second terminal according to the first connection requirement and the second connection requirement of the network domain.

In this embodiment, the orchestration device further includes a second obtaining module 1206 configured to obtain a connection relationship between devices in each network domain in the multi-domain network, a connection relationship between a device in each network domain and a device in an adjacent domain, and information about a terminal that accesses a device in each network domain; a first abstraction module 1207 configured to abstract, as a UNI, an interface used for user access in a network domain; a second abstraction module 1208 configured to abstract, as an ENNI, an interface connected to another network domain in a network domain; a third abstraction module 1209 configured to abstract each network domain as a virtual node, and use a UNI and an ENNI in each network domain as an interface of the virtual node abstracted from the network domain; a fourth abstraction module 1210 configured to abstract the connection relationship between devices in each network domain in the multi-domain network and the connection relationship between a device in each network domain and a device in an adjacent domain as the link information of each network domain, and abstract the information about a terminal that accesses a device in each network domain as information about a terminal that accesses each UNI; and an information combination module 1211 configured to combine the link information of each network domain and the information about a terminal that accesses each UNI into the domain resource information.

In this embodiment, the second obtaining module 1206 obtains various connection relationships between devices in the multi-domain network. The first abstraction module 1207, the second abstraction module 1208, the third abstraction module 1209, and the fourth abstraction module 1210 each abstract a required interface and a connection relationship. The information combination module 1211 combines abstracted interface information and abstracted link information to obtain the domain resource information.

In the foregoing embodiment, the second obtaining module 1206 obtains the connection relationship between devices in each network domain in the multi-domain network, the connection relationship between a device in each network domain and a device in an adjacent domain, and the information about a terminal that accesses a device in each network domain. In actual application, the second obtaining module 1206 may obtain the foregoing information in multiple manners.

Optionally, in another embodiment of the orchestration device in this embodiment of the application, the second obtaining module 1206 may be configured to obtain, using a network management system, the connection relationship between devices in each network domain in the multi-domain network, the connection relationship between a device in each network domain and an adjacent domain, and the information about a terminal that accesses a device in each network domain.

In this embodiment, the second obtaining module 1206 directly obtains the foregoing information using the network management system. This is quicker and easier.

Optionally, in another embodiment of the orchestration device in this embodiment of the application, the second obtaining module 1206 may be configured to receive the connection relationship between devices in each network domain, the connection relationship between a device in each network domain and an adjacent domain, and the information about a terminal that accesses a device in each network domain that are sent by the control device in each network domain.

In this embodiment, the second obtaining module 1206 receives the foregoing information sent by the control device, and the information is directly collected by the control device. This is more accurate.

Figure 13:
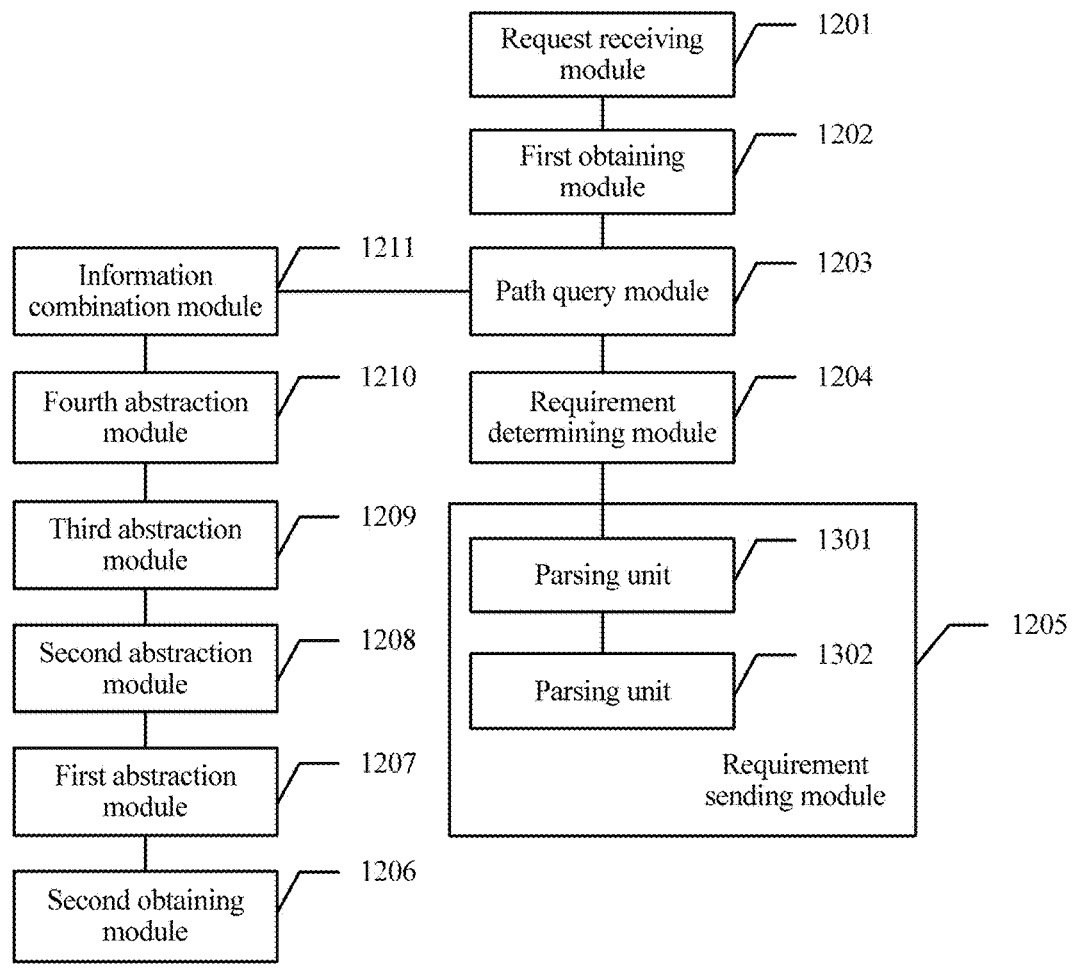
FIG. 13 is another schematic structural diagram of an orchestration device according to an embodiment of the application.

In the foregoing embodiment, the requirement sending module 1205 is configured to send the first connection requirement and the second connection requirement that are obtained by the requirement determining module 1204 and that are of each network domain to the control device in the network domain. In actual application, the requirement sending module 1205 may first parse a UNI or an ENNI in the foregoing connection requirement as a physical interface and then deliver the connection requirement obtained after the parsing. Referring to FIG. 13, in another embodiment of the orchestration device in this embodiment of the application, the foregoing requirement sending module 1205 includes a parsing unit 1301 configured to parse a UNI or an ENNI in the first connection requirement and the second connection requirement of each network domain as a corresponding physical interface in each network domain; and a sending unit 1302 configured to separately send the first connection requirement and the second connection requirement of each network domain that are obtained after the parsing to the control device in the network domain, so that the control device in each network domain establishes the NaaS service from the first terminal to the second terminal according to the first connection requirement and the second connection requirement of the network domain that are obtained after the parsing.

In this embodiment of the application, a parsing unit 1301 first parses a UNI or an ENNI in a connection requirement as a physical interface in each network domain, and then a sending unit 1302 sends the connection requirement obtained after the parsing to a control device in a corresponding network domain, so that a control device in each network domain can directly process a received connection requirement without a need to perform processing again, thereby reducing transformation costs of the control device in the network domain, and improving a speed of processing a requirement by the control device.

2. Abstraction is performed by a control device.

Figure 14:
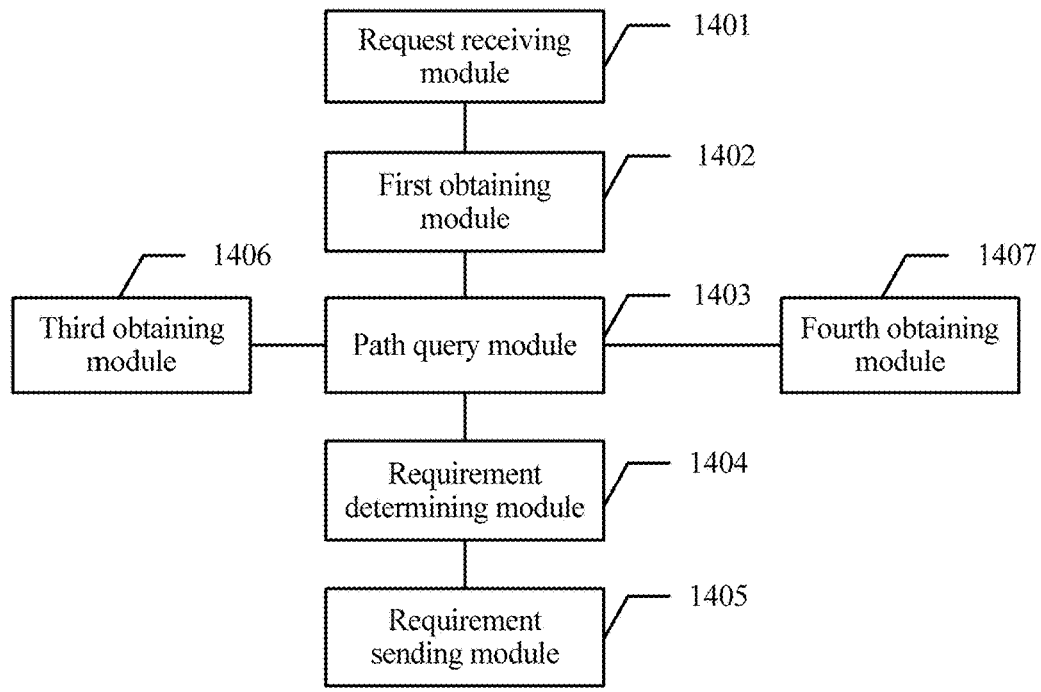
FIG. 14 is another schematic structural diagram of an orchestration device according to an embodiment of the application.

Referring to FIG. 14, another embodiment of an orchestration device in an embodiment of the application includes a request receiving module 1401 configured to receive an NaaS service request, where the NaaS service request is used to request to establish an NaaS service between a first terminal and a second terminal; a first obtaining module 1402 configured to obtain information about a first UNI and information about a second UNI in a multi-domain network according to the NaaS service request received by the request receiving module 1401, where the first UNI is used by the first terminal to access a first network domain, the second UNI is used by the second terminal to access a second network domain, and the multi-domain network includes at least two network domains; a path query module 1403 configured to query domain resource information according to the information about the first UNI and the information about the second UNI that are obtained by the first obtaining module 1402, to obtain a cross-domain path between the first UNI and the second UNI, where the domain resource information includes link information of each network domain in the multi-domain network, and the link information of each network domain includes information about a link from a UNI to an ENNI, information about a link from an ENNI to a UNI, information about a link from an ENNI to another ENNI in a same network domain, and information about a link from an ENNI to an ENNI in an adjacent domain; a requirement determining module 1404 configured to determine network domains that the cross-domain path passes through, and obtain a first connection requirement and a second connection requirement of each network domain of the network domains that the cross-domain path passes through, where the first connection requirement is an intra-domain connection requirement of each network domain, and the second connection requirement is an inter-domain connection requirement between each network domain and an adjacent domain; and a requirement sending module 1405 configured to separately send the first connection requirement and the second connection requirement that are determined by the requirement determining module 1404 and that are of each network domain to a control device in the network domain, so that the control device in each network domain establishes an NaaS service from the first terminal to the second terminal according to the first connection requirement and the second connection requirement of the network domain.

In this embodiment, the orchestration device further includes a third obtaining module 1406 configured to obtain the domain resource information using a network management system; and/or a fourth obtaining module 1407 configured to receive information about a link between a UNI and an ENNI in each network domain, information about a link between ENNIs in each network domain, information about a link from an ENNI in each network domain to an ENNI in an adjacent domain, and information about a terminal that accesses a UNI in each network domain that are sent by the control device in each network domain, and combine the information about a link between a UNI and an ENNI in each network domain, the information about a link between ENNIs in each network domain, the information about a link from an ENNI in each network domain to an ENNI in an adjacent domain, and the information about a terminal that accesses a UNI in each network domain into the domain resource information.

In this embodiment, the third obtaining module 1406 obtains the domain resource information using the network management system, or the fourth obtaining module 1407 receives information abstracted by the control device in each network domain, and combines the information to obtain the domain resource information, and an abstraction process is completed without the orchestration device, thereby reducing costs of the orchestration device, and improving efficiency of processing another step by the orchestration device.

In the foregoing embodiment, the requirement sending module 1405 sends a first connection requirement and a second connection requirement to a control device in a corresponding network domain. Because the abstraction process is completed by the control device in each network domain, parsing of a UNI and an ENNI in a connection requirement is also completed by the control device. Optionally, in another embodiment of the orchestration device in this embodiment of the application, the requirement sending module 1405 may be configured to separately send a first connection requirement and a second connection requirement of each network domain that include a UNI or an ENNI to the control device in the network domain, so that the control device in each network domain establishes an NaaS service from the first terminal to the second terminal according to the first connection requirement and the second connection requirement of the network domain that include a UNI or an ENNI.

In this embodiment, a requirement sending module 1405 sends a connection requirement that includes a UNI or an ENNI to a control device, and the control device completes a parsing process, thereby reducing unnecessary information exchange, and improving service establishment efficiency.

Figure 15:
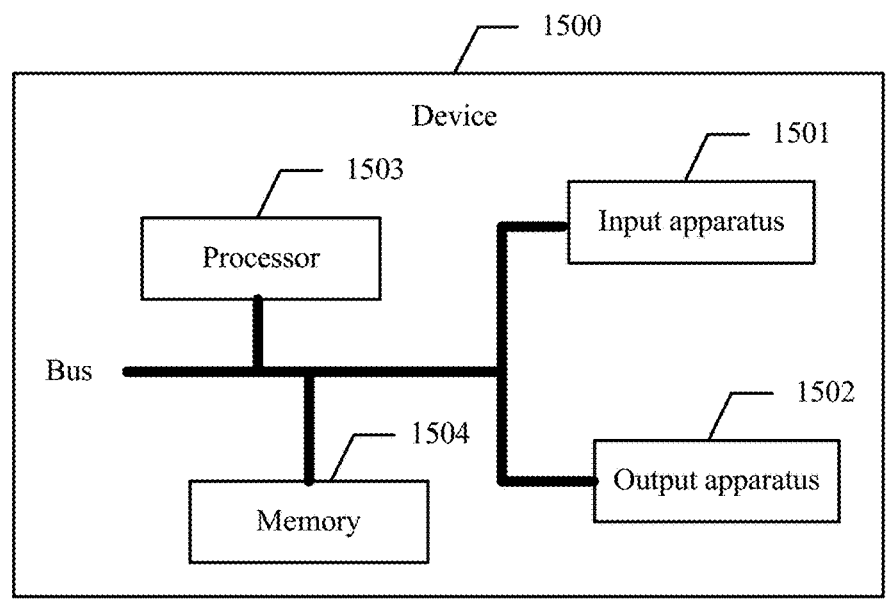
FIG. 15 is a schematic structural diagram of a device according to an embodiment of the application.

Referring to FIG. 15, FIG. 15 is a schematic diagram of a device 1500, and FIG. 15 may be a schematic structural diagram of an orchestration device according to an embodiment of the application, or may be a schematic structural diagram of a control device according to an embodiment of the application. The device 1500 includes an input apparatus 1501, an output apparatus 1502, a processor 1503, and a memory 1504 (there may be one or more processors 1503 in the apparatus 1500, and one processor 1503 is used as an example in FIG. 15). In some embodiments of the application, the input apparatus 1501, the output apparatus 1502, the processor 1503, and the memory 1504 may be connected using a bus or in another manner. In FIG. 15, connection using a bus is used as an example.

When the device is an orchestration device, the processor 1503 is configured to perform the following steps by invoking an operation instruction stored in the memory 1504: receiving an NaaS service request, where the NaaS service request is used to request to establish an NaaS service between a first terminal and a second terminal; obtaining information about a first user-to-network interface UNI and information about a second UNI in a multi-domain network according to the NaaS service request, where the first UNI is used by the first terminal to access a first network domain, the second UNI is used by the second terminal to access a second network domain, and the multi-domain network includes at least two network domains; querying domain resource information according to the information about the first UNI and the information about the second UNI, to obtain a cross-domain path between the first UNI and the second UNI; determining network domains that the cross-domain path passes through, and obtaining a first connection requirement and a second connection requirement of each network domain of the network domains that the cross-domain path passes through, where the first connection requirement is an intra-domain connection requirement of each network domain, and the second connection requirement is an inter-domain connection requirement between each network domain and an adjacent domain; and separately sending the first connection requirement and the second connection requirement of each network domain to a control device in the network domain, so that the control device in each network domain establishes an NaaS service from the first terminal to the second terminal according to the first connection requirement and the second connection requirement of the network domain; where the domain resource information includes link information of each network domain in the multi-domain network, and the link information of each network domain includes information about a link from a UNI to an ENNI, information about a link from an ENNI to a UNI, information about a link from an ENNI to another ENNI in a same network domain, and information about a link from an ENNI to an ENNI in an adjacent domain.

In some embodiments of the application, the processor 1503 is further configured to perform the following steps: obtaining a connection relationship between devices in each network domain in the multi-domain network, a connection relationship between a device in each network domain and a device in an adjacent domain, and information about a terminal that accesses a device in each network domain; abstracting, as a UNI, an interface used for user access in the network domain; abstracting, as an ENNI, an interface connected to another network domain in a network domain; abstracting each network domain as a virtual node, and using a UNI and an ENNI in each network domain as an interface of the virtual node abstracted from the network domain; abstracting the connection relationship between devices in each network domain in the multi-domain network and the connection relationship between a device in each network domain and a device in an adjacent domain as the link information of each network domain, and abstracting the information about a terminal that accesses a device in each network domain as information about a terminal that accesses each UNI; and combining the link information of each network domain and the information about a terminal that accesses each UNI into the domain resource information.

In some embodiments of the application, when performing the step of obtaining a connection relationship between devices in each network domain in the multi-domain network, a connection relationship between a device in each network domain and a device in an adjacent domain, and information about a terminal that accesses a device in each network domain, the processor 1503 is configured to perform the following step: obtaining, using a network management system, the connection relationship between devices in each network domain in the multi-domain network, the connection relationship between a device in each network domain and an adjacent domain, and the information about a terminal that accesses a device in each network domain; or receiving the connection relationship between devices in each network domain, the connection relationship between a device in each network domain and an adjacent domain, and the information about a terminal that accesses a device in each network domain that are sent by the control device in each network domain.

In some embodiments of the application, when performing the step of separately sending the first connection requirement and the second connection requirement of each network domain to a control device in the network domain, the processor 1503 is configured to perform the following steps: parsing a UNI or an ENNI in the first connection requirement and the second connection requirement of each network domain as a corresponding physical interface in each network domain; and separately sending the first connection requirement and the second connection requirement of each network domain that are obtained after the parsing to the control device in the network domain.

In some embodiments of the application, the processor 1503 is further configured to perform the following step: obtaining the domain resource information using a network management system; and/or receiving information about a link between a UNI and an ENNI in each network domain, information about a link between ENNIs in each network domain, information about a link from an ENNI in each network domain to an ENNI in an adjacent domain, and information about a terminal that accesses a UNI in each network domain that are sent by the control device in each network domain, and combining the information about a link between a UNI and an ENNI in each network domain, the information about a link between ENNIs in each network domain, the information about a link from an ENNI in each network domain to an ENNI in an adjacent domain, and the information about a terminal that accesses a UNI in each network domain into the domain resource information.

In some embodiments of the application, when performing a step of sending an end-to-end service requirement of each network domain and a connection requirement between each network domain and an adjacent domain to a control device in a corresponding network domain, the processor 1503 is configured to perform the following step: sending, to the control device in the corresponding network domain, the end-to-end service requirement of each network domain and the connection requirement between each network domain and an adjacent domain, where the end-to-end service requirement and the connection requirement include a UNI or an ENNI.

In some embodiments of the application, when performing the step of querying domain resource information according to the information about the first UNI and the information about the second UNI, to obtain a cross-domain path between the first UNI and the second UNI, the processor 1503 is configured to perform the following step: obtaining the cross-domain path between the first UNI and the second UNI by means of computation according to the information about the first UNI, the information about the second UNI, the domain resource information, and a preset path computation policy, where the preset path computation policy includes minimizing a quantity of network domains that the cross-domain path passes through; or minimizing inter-domain costs when the cross-domain path crosses domains; or ensuring rated inter-domain bandwidth when the cross-domain path traverses domains.

Figure 16:
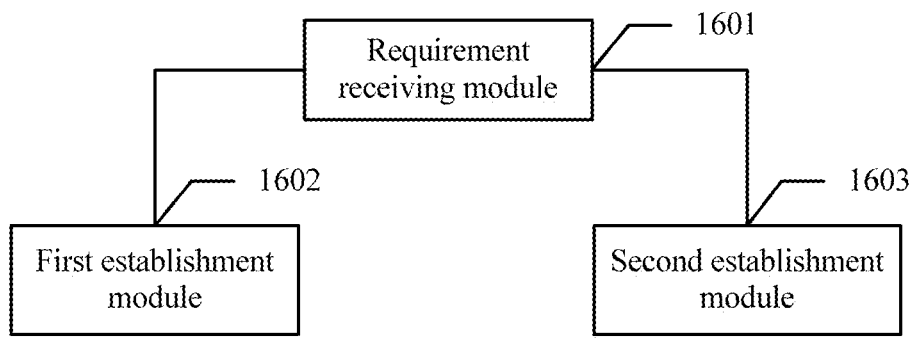
FIG. 16 is a schematic structural diagram of a control device according to an embodiment of the application.

The following describes a control device in an embodiment of the application. Referring to FIG. 16, an embodiment of the control device in this embodiment of the application includes a requirement receiving module 1601 configured to receive a first connection requirement and a second connection requirement of a network domain that are delivered by an orchestration device, where the first connection is an intra-domain connection requirement of the network domain, and the second connection requirement is an inter-domain connection requirement between the network domain and an adjacent domain; a first establishment module 1602 configured to establish an intra-domain data connection in the network domain according to the first connection requirement; and a second establishment module 1603 configured to establish an inter-domain data connection between the network domain and the adjacent domain according to the second connection requirement.

In this embodiment of the application, after the requirement receiving module 1601 receives the first connection requirement and the second connection requirement of the network domain that are delivered by the orchestration device, the first establishment module 1602 establishes a data connection in the network domain according to the first connection requirement, and the second establishment module 1603 establishes a data connection to the adjacent domain according to the second connection requirement. Each control device, in each network domain in a multi-domain network, that receives a first connection requirement and a second connection requirement performs same processing, that is, completes an end-to-end cross-domain service connection in the entire multi-domain network by means of orchestration.

In actual application, the control device may collect a connection relationship between devices, and abstracts the connection relationship and then sends information obtained after the abstraction to the orchestration device, or may directly send collected information, and the orchestration device completes an abstraction process.

1. A control device collects and abstracts information.

Figure 17:
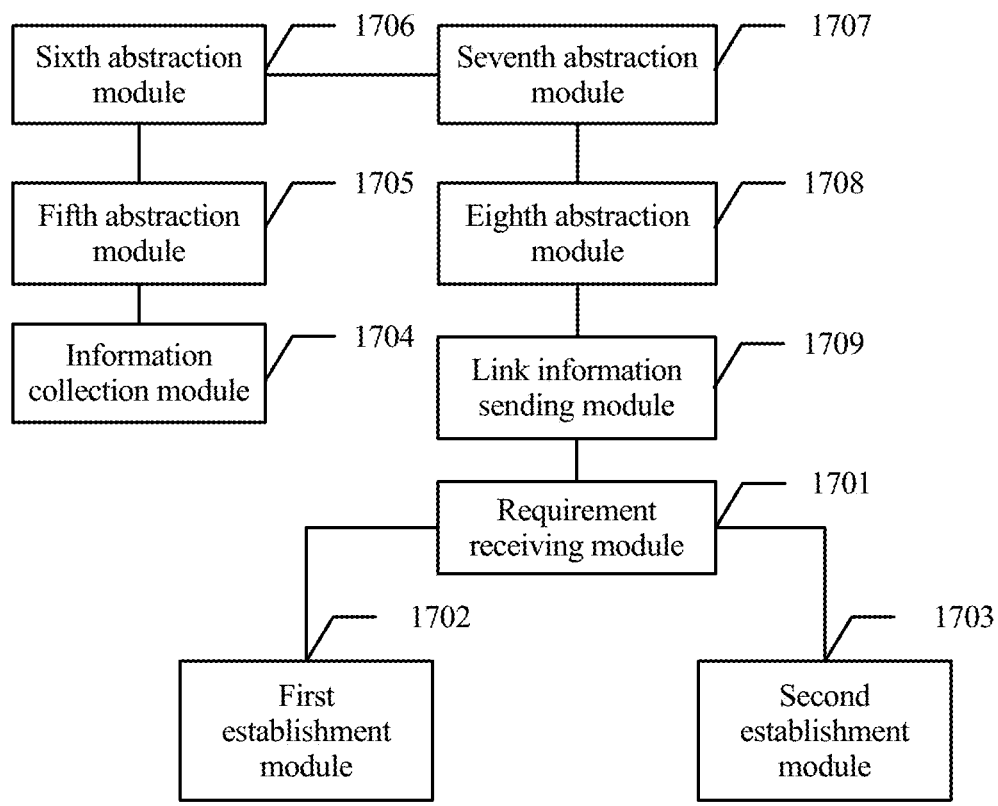
FIG. 17 is another schematic structural diagram of a control device according to an embodiment of the application.

Referring to FIG. 17, another embodiment of a control device in an embodiment of the application includes a requirement receiving module 1701 configured to receive a first connection requirement and a second connection requirement of a network domain that are delivered by an orchestration device, where the first connection is an intra-domain connection requirement of the network domain, and the second connection requirement is an inter-domain connection requirement between the network domain and an adjacent domain; a first establishment module 1702 configured to establish an intra-domain data connection in the network domain according to the first connection requirement; and a second establishment module 1703 configured to establish an inter-domain data connection between the network domain and the adjacent domain according to the second connection requirement.

In this embodiment, the control device further includes an information collection module 1704 configured to collect a connection relationship between devices in the network domain, a connection relationship between a device and the adjacent domain, and information about a terminal that accesses a device; a fifth abstraction module 1705 configured to abstract, as a UNI, an interface used for user access in the network domain; a sixth abstraction module 1706 configured to abstract, as an ENNI, an interface connected to the adjacent domain in the network domain; a seventh abstraction module 1707 configured to abstract the network domain as a virtual node, and use the abstracted UNI and the abstracted ENNI as an interface of the virtual node; an eighth abstraction module 1708 configured to abstract the connection relationship between devices in the network domain as information about a link between a UNI and an ENNI in the network domain and information about a link between ENNIs in the network domain, abstract the connection relationship between a device in the network domain and the adjacent domain as information about a link between an ENNI in the network domain and an ENNI in the adjacent domain, and abstract the information about a terminal that accesses a device as information about a terminal that accesses a UNI; and a link information sending module 1709 configured to send, to the orchestration device, the abstracted information about a link between a UNI and an ENNI in the network domain, the abstracted information about a link between ENNIs in the network domain, the abstracted information about a link between an ENNI in the network domain and an ENNI in the adjacent domain, and the abstracted information about a terminal that accesses a UNI.

In this embodiment, the information collection module 1704 collects the connection relationship between devices in the network domain, the connection relationship between a device and the adjacent domain, and the information about a terminal that accesses a device; the fifth abstraction module 1705, the sixth abstraction module 1706, the seventh abstraction module 1707, and the eighth abstraction module 1708 complete abstraction; and the link information sending module 1709 sends information obtained after the abstraction to the orchestration device, thereby reducing performance costs of the orchestration device, and improving service establishment efficiency.

Figure 18:
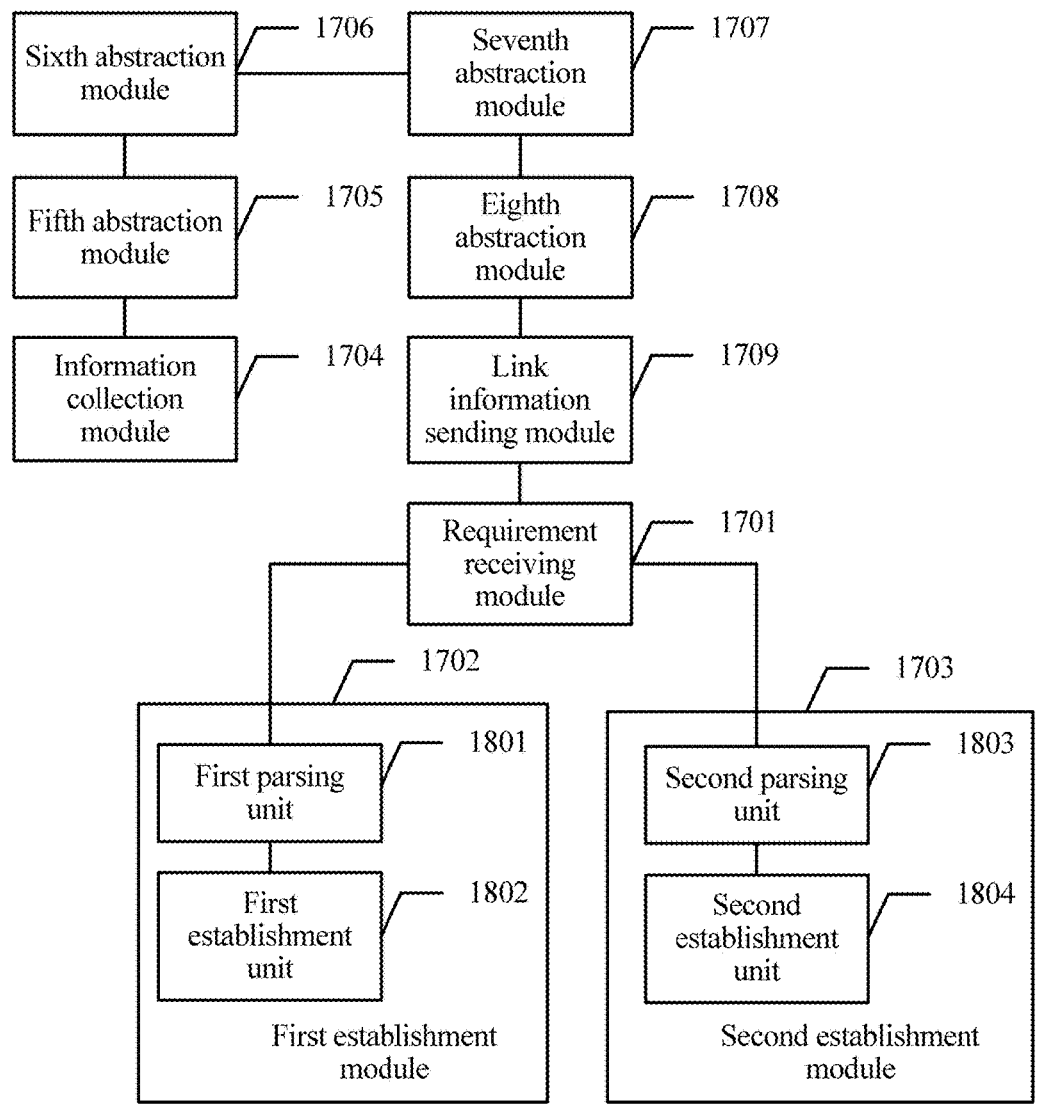
FIG. 18 is another schematic structural diagram of a control device according to an embodiment of the application.

In actual application, after the control device completes information abstraction, parsing of a connection requirement may be also completed by the control device. Referring to FIG. 18, in another embodiment of the control device in this embodiment, the first establishment module 1702 includes a first parsing unit 1801 configured to parse a UNI or an ENNI in the first connection requirement as a physical interface in the network domain; and a first establishment unit 1802 configured to establish, according to the first connection requirement, a data connection between physical interfaces obtained by means of parsing.

The second establishment module 1703 includes a second parsing unit 1803 configured to parse an ENNI in the second connection requirement as a physical interface in the network domain or a physical interface in the adjacent domain; and a second establishment unit 1804 configured to establish, according to the second connection requirement, a data connection between the physical interface in the network domain and the physical interface in the adjacent domain that are obtained by means of parsing.

In this embodiment, the first parsing unit 1801 and the second parsing unit 1803 parse a UNI or an ENNI in a connection requirement delivered by the orchestration device as a physical interface, and the first establishment unit 1802 and the second establishment unit 1804 establish data connections between physical interfaces according to the connection requirement obtained after the parsing, to implement an end-to-end cross-domain service connection.

2. Collected information is directly sent, and an orchestration device completes an abstraction process.

Figure 19:
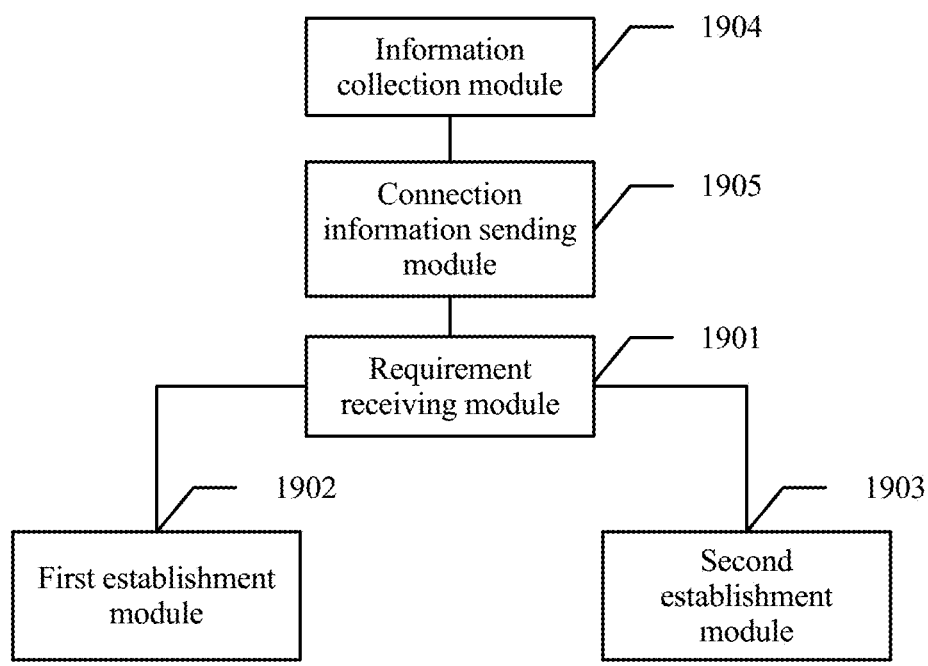
FIG. 19 is another schematic structural diagram of a control device according to an embodiment of the application.

Referring to FIG. 19, another embodiment of a control device in an embodiment of the application includes a requirement receiving module 1901 configured to receive a first connection requirement and a second connection requirement of a network domain that are delivered by an orchestration device, where the first connection is an intra-domain connection requirement of the network domain, and the second connection requirement is an inter-domain connection requirement between the network domain and an adjacent domain; a first establishment module 1902 configured to establish an intra-domain data connection in the network domain according to the first connection requirement; and a second establishment module 1903 configured to establish an inter-domain data connection between the network domain and the adjacent domain according to the second connection requirement.

In this embodiment, the control device further includes an information collection module 1904 configured to collect a connection relationship between devices in the network domain, a connection relationship between a device and the adjacent domain, and information about a terminal that accesses a device; and a connection information sending module 1905 configured to send, to the orchestration device, the connection relationship between devices, the connection relationship between a device and the adjacent domain, and the information about a terminal that accesses a device that are collected by the information collection module.

In this embodiment, the first establishment module 1902 is configured to establish, according to the first connection requirement that includes physical interfaces in the network domain, a data connection between the physical interfaces in the first connection requirement; and the second establishment module 1903 is configured to establish, according to the second connection requirement that includes a physical interface in the network domain and a physical interface in the adjacent domain, a data connection between the physical interface in the network domain and the physical interface in the adjacent domain.

In this embodiment, the connection information sending module 1905 directly sends collected information, and the orchestration device completes an abstraction process. A connection requirement sent by the orchestration apparatus includes a physical interface obtained after parsing, and the first establishment module 1902 and the second establishment module 1903 may directly establish a data connection between physical interfaces according to the connection requirement without a need to parse the connection requirement, thereby improving connection establishment efficiency.

Referring to FIG. 15, when the device shown in FIG. 15 is a control device, in another embodiment of a control device in an embodiment of the application, the processor 1503 is configured to perform the following steps by invoking an operation instruction stored in the memory 1504: receiving a first connection requirement and a second connection requirement of a network domain that are delivered by an orchestration device, where the first connection is an intra-domain connection requirement of the network domain, and the second connection requirement is an inter-domain connection requirement between the network domain and an adjacent domain; establishing an intra-domain data connection in the network domain according to the first connection requirement; and establishing an inter-domain data connection between the network domain and the adjacent domain according to the second connection requirement.

In some embodiments of the application, the processor 1503 is further configured to perform the following steps: collecting a connection relationship between devices in the network domain, a connection relationship between a device and the adjacent domain, and information about a terminal that accesses a device; abstracting, as a UNI, an interface used for user access in the network domain; abstracting, as an ENNI, an interface connected to the adjacent domain in the network domain; abstracting the network domain as a virtual node, and using the abstracted UNI and the abstracted ENNI as an interface of the virtual node; abstracting the connection relationship between devices in the network domain as information about a link between a UNI and an ENNI in the network domain and information about a link between ENNIs in the network domain, abstracting the connection relationship between a device in the network domain and the adjacent domain as information about a link between an ENNI in the network domain and an ENNI in the adjacent domain, and abstracting the information about a terminal that accesses a device as information about a terminal that accesses a UNI; and sending, to the orchestration device, the abstracted information about a link between a UNI and an ENNI in the network domain, the abstracted information about a link between ENNIs in the network domain, the abstracted information about a link between an ENNI in the network domain and an ENNI in the adjacent domain, and the abstracted information about a terminal that accesses a UNI.

In some embodiments of the application, when performing the step of establishing an intra-domain data connection in the network domain according to the first connection requirement, the processor 1503 performs the following steps: parsing a UNI or an ENNI in the first connection requirement as a physical interface in the network domain; and establishing, according to the first connection requirement, a data connection between physical interfaces obtained by means of parsing.

When performing the step of establishing an inter-domain data connection between the network domain and the adjacent domain according to the second connection requirement, the processor 1503 performs the following steps: parsing an ENNI in the second connection requirement as a physical interface in the network domain or a physical interface in the adjacent domain; and establishing, according to the second connection requirement, a data connection between the physical interface in the network domain and the physical interface in the adjacent domain that are obtained by means of parsing.

In some embodiments of the application, the processor 1503 is further configured to perform the following steps: collecting a connection relationship between devices in the network domain, a connection relationship between a device and the adjacent domain, and information about a terminal that accesses a device; and sending, to the orchestration device, the collected connection relationship between devices, the collected connection relationship between a device and the adjacent domain, and the collected information about a terminal that accesses a device.

In some embodiments of the application, when performing the step of establishing an intra-domain data connection in the network domain according to the first connection requirement, the processor 1503 performs the following step: establishing, according to the first connection requirement that includes physical interfaces in the network domain, a data connection between the physical interfaces in the first connection requirement.

When performing the step of establishing an inter-domain data connection between the network domain and the adjacent domain according to the second connection requirement, the processor 1503 performs the following step: establishing, according to the second connection requirement that includes a physical interface in the network domain and a physical interface in the adjacent domain, a data connection between the physical interface in the network domain and the physical interface in the adjacent domain.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the application, but not for limiting the application. Although the application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the application.

What is claimed is:

1. A network as a service (NaaS) service cross-domain orchestration method comprising:
receiving, by an orchestration device, an NaaS service request, wherein the NaaS service request is used to request to establish an NaaS service between a first terminal and a second terminal;

obtaining, by the orchestration device, information about a first user-to-network interface (UNI) and information about a second UNI in a multi-domain network according to the NaaS service request, wherein the first UNI is used by the first terminal to access a first network domain, wherein the second UNI is used by the second terminal to access a second network domain, and wherein the multi-domain network comprises at least two network domains;

querying, by the orchestration device, domain resource information according to the information about the first UNI and the information about the second UNI, to obtain a cross-domain path between the first UNI and the second UNI;

obtaining, by the orchestration device, a first connection requirement and a second connection requirement of each network domain of network domains that the cross-domain path passes through, wherein the first connection requirement is an intra-domain connection requirement of each network domain, and wherein the second connection requirement is an inter-domain connection requirement between each network domain and an adjacent domain; and separately sending, by the orchestration device, the first connection requirement and the second connection requirement of each network domain to a control device in the network domain, wherein the first connection requirement and the second connection requirement of each network domain are used for establishing, by the control device, the NaaS service from the first terminal to the second terminal, wherein the domain resource information comprises link information of each network domain in the multi-domain network, and wherein the link information of each network domain comprises information about a link from a UNI to an external network-to-network interface (ENNI), information about a link from an ENNI to a UNI, information about a link from an ENNI to another ENNI in a same network domain, and information about a link from an ENNI to an ENNI in an adjacent domain.

2. The method according to claim 1, wherein before querying the domain resource information, the method further comprises:

obtaining, by the orchestration device, a connection relationship between devices in each network domain in the multi-domain network, a connection relationship between a device in each network domain and a device in an adjacent domain, and information about a terminal that accesses a device in each network domain;

abstracting, by the orchestration device as a UNI, an interface used for user access in a network domain;

abstracting, by the orchestration device as an ENNI, an interface connected to another network domain in a network domain;

abstracting, by the orchestration device, each network domain as a virtual node;

using, by the orchestration device, a UNI and an ENNI in each network domain as an interface of the virtual node abstracted from the network domain;

abstracting, by the orchestration device, the connection relationship between devices in each network domain in the multi-domain network and the connection relationship between a device in each network domain and a device in an adjacent domain as the link information of each network domain;

abstracting, by the orchestration device, the information about a terminal that accesses a device in each network domain as information about a terminal that accesses each UNI; and combining, by the orchestration device, the link information of each network domain and the information about a terminal that accesses each UNI into the domain resource information.

3. The method according to claim 2, wherein obtaining, by the orchestration device, the connection relationship between the devices in each network domain in the multi-domain network, the connection relationship between the device in each network domain and the adjacent domain, and the information about the terminal that accesses the device in each network domain comprises at least one of:

obtaining, by the orchestration device using a network management system the connection relationship between devices in each network domain in the multi-domain network, the connection relationship between a device in each network domain and an adjacent domain, and the information about a terminal that accesses a device in each network domain; or receiving, by the orchestration device, the connection relationship between devices in each network domain, the connection relationship between a device in each network domain and an adjacent domain, and the information about a terminal that accesses a device in each network domain that are from the control device in each network domain.

4. The method according to claim 3, wherein separately sending, by the orchestration device, the first connection requirement and the second connection requirement of each network domain to the control device in the network domain comprises:

parsing, by the orchestration device, a UNI or an ENNI in the first connection requirement and the second connection requirement of each network domain as a corresponding physical interface in each network domain; and separately sending, by the orchestration device, the first connection requirement and the second connection requirement of each network domain that are obtained after the parsing to the control device in the network domain.

5. The method according to claim 1, wherein before querying the domain resource information, the method further comprises:

obtaining, by the orchestration device, the domain resource information; or receiving, by the orchestration device, information about a link between a UNI and an ENNI in each network domain, information about a link between ENNIs in each network domain, information about a link from an ENNI in each network domain to an ENNI in an adjacent domain, and information about a terminal that accesses a UNI in each network domain that are from the control device in each network domain, and combining the information about a link between a UNI and an ENNI in each network domain, the information about a link between ENNIs in each network domain, the information about a link from an ENNI in each network domain to an ENNI in an adjacent domain, and the information about a terminal that accesses a UNI in each network domain into the domain resource information.

6. The method according to claim 5, wherein separately sending, by the orchestration device, the first connection requirement and the second connection requirement of each network domain to the control device in the network domain comprises separately sending, by the orchestration device, a first connection requirement and a second connection requirement of each network domain that comprise a UNI or an ENNI to the control device in the network domain.

7. The method according to claim 1, wherein querying, by the orchestration device, the domain resource information according to the information about the first UNI and the information about the second UNI, to obtain the cross-domain path between the first UNI and the second UNI comprises obtaining, by the orchestration device, the cross-domain path between the first UNI and the second UNI by means of computation according to the information about the first UNI, the information about the second UNI, the domain resource information, and a preset path computation policy, and wherein the preset path computation policy comprises at least one of the following:
minimizing a quantity of network domains that the cross-domain path passes through;
minimizing inter-domain costs when the cross-domain path crosses domains; or
ensuring rated inter-domain bandwidth when the cross-domain path traverses domains.

8. An orchestration device, comprising:
a memory comprising instructions; and
a processor coupled to the memory, wherein instructions cause the processor to be configured to:
receive a network as a service (NaaS) service request, wherein the NaaS service request is used to request to establish an NaaS service between a first terminal and a second terminal;
obtain information about a first user-to-network interface (UNI) and information about a second UNI in a multi-domain network according to the NaaS service request, wherein the first UNI is used by the first terminal to access a first network domain, wherein the second UNI is used by the second terminal to access a second network domain, and wherein the multi-domain network comprises at least two network domains;
query domain resource information according to the information about the first UNI and the information about the second UNI, to obtain a cross-domain path between the first UNI and the second UNI;
obtain a first connection requirement and a second connection requirement of each network domain of network domains that the cross-domain path passes through, wherein the first connection requirement is an intra-domain connection requirement of each network domain, and wherein the second connection requirement is an inter-domain connection requirement between each network domain and an adjacent domain; and
separately send the first connection requirement and the second connection requirement of each network domain to a control device in the network domain, wherein the first connection requirement and the second connection requirement of each network domain are used for establishing, by the control device, the NaaS service from the first terminal to the second terminal wherein the domain resource information comprises link information of each network domain in the multi-domain network, and
wherein the link information of each network domain comprises information about a link from a UNI to an external network-to-network interface (ENNI), information about a link from an ENNI to a UNI, information about a link from an ENNI to another ENNI in a same network domain, and information about a link from an ENNI to an ENNI in an adjacent domain.

9. The orchestration device according to claim 8, wherein the instructions further cause the processor to be configured to:
obtain a connection relationship between devices in each network domain in the multi-domain network, a connection relationship between a device in each network domain and a device in an adjacent domain, and information about a terminal that accesses a device in each network domain;
abstract, as a UNI, an interface used for user access in a network domain;
abstract, as an ENNI, an interface connected to another network domain in a network domain;
abstract each network domain as a virtual node;
use a UNI and an ENNI in each network domain as an interface of the virtual node abstracted from the network domain;
abstract the connection relationship between devices in each network domain in the multi-domain network and the connection relationship between a device in each network domain and a device in an adjacent domain as the link information of each network domain;
abstract the information about a terminal that accesses a device in each network domain as information about a terminal that accesses each UNI; and
combine the link information of each network domain and the information about a terminal that accesses each UNI into the domain resource information.

10. The orchestration device according to claim 9, wherein when the instructions cause the processor to be configured to obtain the connection relationship between the devices in each network domain in the multi-domain network, the connection relationship between the device in each network domain and the device in the adjacent domain, and the information about the terminal that accesses the device in each network domain, the processor is configured to perform at least one of the following steps:
obtain, using a network management system, the connection relationship between devices in each network domain in the multi-domain network, the connection relationship between a device in each network domain and an adjacent domain, and the information about a terminal that accesses a device in each network domain; or
receive the connection relationship between devices in each network domain, the connection relationship between a device in each network domain and an adjacent domain, and the information about a terminal that accesses a device in each network domain that are from the control device in each network domain.

11. The orchestration device according to claim 10, wherein when the instructions cause the processor to be configured to separately send the first connection requirement and the second connection requirement of each network domain to the control device in the network domain, the processor is configured to perform the following steps:

parse a UNI or an ENNI in the first connection requirement and the second connection requirement of each network domain as a corresponding physical interface in each network domain; and separately send the first connection requirement and the second connection requirement of each network domain that are obtained after the parsing to the control device in the network domain.

12. The orchestration device according to claim 8, wherein the instructions further cause the processor to be configured to perform at least one of the following steps:

obtain the domain resource information using a network management system; or receive information about a link between a UNI and an ENNI in each network domain, information about a link between ENNIs in each network domain, information about a link from an ENNI in each network domain to an ENNI in an adjacent domain, and information about a terminal that accesses a UNI in each network domain that are from the control device in each network domain, and combining the information about a link between a UNI and an ENNI in each network domain, the information about a link between ENNIs in each network domain, the information about a link from an ENNI in each network domain to an ENNI in an adjacent domain, and the information about a terminal that accesses a UNI in each network domain into the domain resource information.

13. The orchestration device according to claim 12, wherein when the instructions cause the processor to be configured to send the end-to-end service requirement of each network domain and the connection requirement between each network domain and the adjacent domain to the control device in the corresponding network domain, the processor is configured to send, to the control device in the corresponding network domain, the end-to-end service requirement of each network domain and the connection requirement between each network domain and an adjacent domain, and wherein the end-to-end service requirement and the connection requirement comprise a UNI or an ENNI.

14. The orchestration device according to claim 8, wherein when the instructions cause the processor to be configured to query the domain resource information according to the information about the first UNI and the information about the second UNI, to obtain the cross-domain path between the first UNI and the second UNI, the processor is configured to obtain the cross-domain path between the first UNI and the second UNI by computation according to the information about the first UNI, the information about the second UNI, the domain resource information, and a preset path computation policy, and wherein the preset path computation policy comprises at least one of the following:

minimizing a quantity of network domains that the cross-domain path passes through;

minimizing inter-domain costs when the cross-domain path crosses domains; or ensuring rated inter-domain bandwidth when the cross-domain path traverses domains.

15. A control device, comprising:
a memory comprising instructions; and
a processor coupled to the memory, wherein the instructions cause the processor to be configured to:
receive a first connection requirement and a second connection requirement of a network domain that are delivered by an orchestration device, wherein the first connection requirement is an intra-domain connection requirement of the network domain, and wherein the second connection requirement is an inter-domain connection requirement between the network domain and an adjacent domain;

establish an intra-domain data connection in the network domain according to the first connection requirement; and establish an inter-domain data connection between the network domain and the adjacent domain according to the second connection requirement;

collect a connection relationship between devices in the network domain, a connection relationship between a device and the adjacent domain, and information about a terminal that accesses a device; and send, to the orchestration device, the collected connection relationship between devices, the collected connection relationship between a device and the adjacent domain, and the collected information about a terminal that accesses a device.

16. The control device according to claim 15, wherein the instructions further cause the processor to be configured to:

abstract, as a user-to-network interface (UNI), an interface used for user access in the network domain;

abstract, as an external network-to-network interface (ENNI), an interface connected to the adjacent domain in the network domain;

abstract the network domain as a virtual node;

use the abstracted UNI and the abstracted ENNI as an interface of the virtual node;

abstract the connection relationship between devices in the network domain as information about a link between a UNI and an ENNI in the network domain and information about a link between ENNIs in the network domain;

abstract the connection relationship between a device in the network domain and the adjacent domain as information about a link between an ENNI in the network domain and an ENNI in the adjacent domain;

abstract the information about a terminal that accesses a device as information about a terminal that accesses a UNI; and send, to the orchestration device, the abstracted information about a link between a UNI and an ENNI in the network domain, the abstracted information about a link between ENNIs in the network domain, the abstracted information about a link between an ENNI in the network domain and an ENNI in the adjacent domain, and the abstracted information about a terminal that accesses a UNI.

17. The control device according to claim 16, wherein when the instructions cause the processor to be configured to establish the intra-domain data connection in the network domain according to the first connection requirement, the processor is configured to:

parse a UNI or an ENNI in the first connection requirement as a physical interface in the network domain; and establish, according to the first connection requirement, a data connection between physical interfaces obtained by means of parsing, and wherein when the instructions cause the processor to be configured to establish the inter-domain data connection between the network domain and the adjacent domain according to the second connection requirement, the processor is configured to:

parse an ENNI in the second connection requirement as a physical interface in the network domain or a physical interface in the adjacent domain; and establish, according to the second connection requirement, a data connection between the physical interface in the network domain and the physical interface in the adjacent domain that are obtained by means of parsing.

18. The control device according to claim 15, wherein when the instructions cause the processor to be configured to establish the intra-domain data connection in the network domain according to the first connection requirement, the processor is configured to establish, according to the first connection requirement that comprises physical interfaces in the network domain, a data connection between the physical interfaces in the first connection requirement, and wherein when the instructions cause the processor to be configured to establish the inter-domain data connection between the network domain and the adjacent domain according to the second connection requirement, the processor is configured to establish, according to the second connection requirement that comprises a physical interface in the network domain and a physical interface in the adjacent domain, a data connection between the physical interface in the network domain and the physical interface in the adjacent domain.

* * * * *